(12) United States Patent
Khoyi et al.

(10) Patent No.: US 10,061,628 B2
(45) Date of Patent: Aug. 28, 2018

(54) SYSTEM AND METHOD FOR DATA ACCESS AND REPLICATION IN A DISTRIBUTED ENVIRONMENT UTILIZING DATA DERIVED FROM DATA ACCESS WITHIN THE DISTRIBUTED ENVIRONMENT

(71) Applicant: Open Text SA ULC, Halifax (CA)

(72) Inventors: Dana Lawrence Khoyi, Westford, MA (US); John Patino-Bueno, Hudson, NH (US); John Martin Pratt, Atkinson, NH (US)

(73) Assignee: Open Text SA ULC, Halifax (CA)

( * ) Notice: Subject to any disclaimer, the term of this patent is extended or adjusted under 35 U.S.C. 154(b) by 188 days.

(21) Appl. No.: 14/656,800

(22) Filed: Mar. 13, 2015

(65) Prior Publication Data
US 2015/0261468 A1 Sep. 17, 2015

Related U.S. Application Data

(60) Provisional application No. 61/952,656, filed on Mar. 13, 2014.

(51) Int. Cl.
*G06F 11/00* (2006.01)

(52) U.S. Cl.
CPC .................. *G06F 11/00* (2013.01)

(58) Field of Classification Search
CPC ...... G06F 3/0619; G06F 3/067; G06F 3/0665; G06F 3/0689
See application file for complete search history.

(56) References Cited

U.S. PATENT DOCUMENTS

| 5,544,347 | A  | * | 8/1996  | Yanai | G06F 3/0601 711/162 |
| 5,742,792 | A  | * | 4/1998  | Yanai | G06F 3/0601 710/1   |
| 6,173,377 | B1 | * | 1/2001  | Yanai | G06F 3/0601 711/154 |
| 6,502,205 | B1 | * | 12/2002 | Yanai | G06F 3/0601 714/6.32 |
| 6,625,705 | B2 | * | 9/2003  | Yanai | G06F 3/0601 711/161 |

(Continued)

OTHER PUBLICATIONS

Webopedia, "Paging", Aug. 9, 2002, pp. 1-2, https://web.archive.org/web/20020809123737/http://www.webopedia.com/TERM/P/paging.html.*

(Continued)

*Primary Examiner* — Christopher D Birkhimer
(74) *Attorney, Agent, or Firm* — Sprinkle IP Law Group

(57) ABSTRACT

Embodiments of distributed storage systems are disclosed herein. Certain embodiments maintain statistics associated with storage locations within the distributed storage system at servers within the distributed storage systems. The statistics maintained at each server may be particularized to that server with respect to each storage location. These statistics may be utilized to predict access costs associated with requests for data (e.g., read or write requests) within the distributed storage system. The predicted access costs are, in turn, used to select a storage location in servicing the data access requests increasing computer performance and efficiency at least by decreasing access involved with requests for such data.

25 Claims, 11 Drawing Sheets

(56) References Cited

U.S. PATENT DOCUMENTS

| | | | | |
|---|---|---|---|---|
| 6,647,474 B2* | 11/2003 | Yanai | G06F 3/0601 | 711/161 |
| 6,845,431 B2* | 1/2005 | Camble | G06F 3/0601 | 711/152 |
| 7,055,059 B2* | 5/2006 | Yanai | G06F 3/0601 | 714/6.32 |
| 7,073,090 B2* | 7/2006 | Yanai | G06F 3/0601 | 714/6.31 |
| 7,185,314 B2* | 2/2007 | Yellin | G06F 11/3452 | 714/E11.197 |
| 7,200,715 B2* | 4/2007 | Kleiman | G06F 3/0613 | 711/111 |
| 7,240,238 B2* | 7/2007 | Yanai | G06F 3/0601 | 714/6.32 |
| 7,930,475 B1* | 4/2011 | Kleiman | G06F 3/0613 | 711/114 |
| 7,958,324 B2* | 6/2011 | Tokoro | G06F 3/0611 | 711/100 |
| 7,979,633 B2* | 7/2011 | Kleiman | G06F 3/0613 | 711/114 |
| 8,566,626 B2* | 10/2013 | Dutton | G06F 1/3221 | 711/112 |
| 2002/0194442 A1* | 12/2002 | Yanai | G06F 13/28 | 711/158 |
| 2003/0005355 A1* | 1/2003 | Yanai | G06F 3/0601 | 714/5.11 |
| 2003/0167419 A1* | 9/2003 | Yanai | G06F 3/0601 | 714/6.31 |
| 2003/0182502 A1* | 9/2003 | Kleiman | G06F 3/0613 | 711/114 |
| 2004/0064633 A1* | 4/2004 | Oota | G06F 3/0613 | 711/100 |
| 2004/0073831 A1* | 4/2004 | Yanai | G06F 3/0601 | 714/6.32 |
| 2004/0205387 A1* | 10/2004 | Kleiman | G06F 3/0613 | 714/6.11 |
| 2004/0243987 A1* | 12/2004 | Yellin | G06F 11/3452 | 717/151 |
| 2006/0005074 A1* | 1/2006 | Yanai | G06F 3/0601 | 714/6.32 |
| 2009/0240902 A1* | 9/2009 | Tokoro | G06F 3/0611 | 711/158 |
| 2011/0040568 A1* | 2/2011 | Dutton | G06F 1/3221 | 705/1.1 |
| 2012/0047327 A1* | 2/2012 | Ueda | G06F 3/0613 | 711/114 |
| 2012/0278549 A1* | 11/2012 | Dutton | G06F 1/3221 | 711/112 |
| 2013/0198140 A1* | 8/2013 | Keith, Jr. | G06F 11/1448 | 707/649 |
| 2013/0346711 A1* | 12/2013 | Beeken | G06F 3/065 | 711/162 |
| 2013/0346713 A1* | 12/2013 | Beeken | G06F 3/065 | 711/162 |
| 2014/0013134 A1* | 1/2014 | Dutton | G06F 1/3221 | 713/320 |

OTHER PUBLICATIONS

Webopedia, "Background", Aug. 8, 2002, pp. 1-2, https://web.archive.org/web/20020808155658/http://www.webopedia.com/TERM/b/background.html.*

* cited by examiner

SYSTEM AND METHOD FOR DATA ACCESS AND REPLICATION IN A DISTRIBUTED ENVIRONMENT UTILIZING DATA DERIVED FROM DATA ACCESS WITHIN THE DISTRIBUTED ENVIRONMENT

RELATED APPLICATIONS

This application claims a benefit of priority under 35 U.S.C. 119 to U.S. Provisional Patent Application Ser. No. 61/952,656, filed Mar. 13, 2014, entitled "System and Method for Data Replication," which is incorporated herein in its entirety by reference.

TECHNICAL FIELD

This disclosure describes various embodiments of systems and methods for data replication in a distributed environment. More particularly, embodiments include methods and systems for efficient data replication in a distributed environment utilizing cost of access calculated based on periodically updated statistics derived from actual data accesses involved with such data storage and replication.

BACKGROUND

In today's computerized world an increasing amount of data is stored in electronic format. In many cases, such data may exist only in electronic form, making the security and recovery of such data of utmost importance, as the data cannot be recovered in any other manner. Many data storage systems thus include a set of distributed locations where the data can be stored and they function to replicate data stored in one location to other locations so that the data can be recovered in the event of a device failure, network failure or disaster that prevents the data from being accessed from the initial storage location.

The methods used to replicate the data vary between different data storage systems. In some existing data replication schemes, a server will read/write data from/to the same storage volume unless the storage volume is unavailable, in which case the server will access a replicated copy of the data from another location that is hard coded.

In some other data replication schemes, storage locations are assigned a hard coded weight. For example, if a system has three replicated storage volumes named Volume1, Volume2, and Volume3, a hard coded weight is assigned to each volume such as 0, 1, 2. The available volume with the lowest assigned weight may be used unless the hard coded weights are manually changed. In other words, a first copy of data may be stored in Volume1 with weight 0, a second copy of the data may be stored in Volume 2 with weight 1, etc.

The methods used by such data storage systems to replicate data are, in general, inefficient. To illustrate in more detail, in today's highly distributed computer environment there may be a variety of factors that affect the speed of access to such storage. The dynamic nature of distributed and networked computer environments also means that such factors are dynamically changing and such changes may occur on a highly granular time scale and may change differently with respect to different computer devices within a distributed computer environment. Other factors may also affect the time it takes to complete data accesses in these storage systems, such as for example, whether the data access is a write or a read and the amount (size) of data to be read or written. Current data replication schemes, as has been discussed, may use the same storage volumes in the same order to replicate the data irrespective of any of these, or any other, factors. By adhering to such rigid data replication schemes these data storage systems neglect to account for available bandwidth, differing bandwidths between different storage locations, whether the access is a read or a write, the size of the data being accessed or any of a number of other factors. By neglecting these factors access to data in these types of data storage systems may be inefficient, resulting in increased access times for user among other disadvantages.

What is desired then, are data storage systems that account for such factors in performing data replication to increase the efficiency and performance of data access in data storage systems by increasing efficiency in data replication.

SUMMARY

Embodiments of the systems disclosed may maintain statistics or other data associated with storage locations within the distributed storage system at each server within the distributed storage systems. Thus, the statistics or other data (collectively statistics herein) maintained at each server may be particularized to that server with respect to each storage location (e.g., the statistics relate to data accesses from that particular server) and the resulting predicted access cost associated with a requested data access may be particular for the server servicing that requested data access. As the predicted access costs used to select a storage location in servicing a data access request at a server is particularized to that server, computer performance and efficiency is increased as access time may be decreased no matter the server that services a particular data access request.

Efficiency and computer performance may likewise be increased by performing data replication as a data access in the background according to substantially the same methodology. Specifically, according to certain embodiments, when a data access specifies that data is to be written the server that initially receives the data access request may access the statistics or other data maintained at that server may be accessed, access costs for storage locations predicted, a storage location selected based on the predicted access costs and the data written to the selected storage location. The user can then be notified that the file has been written. The file can then be replicated to one or more additional storage location using the same methodology. In other words, predicted access costs for the other storage locations (e.g., the storage locations other than the initially selected storage locations) may be determined and a second storage location for the data may be selected based on the predicted access costs for the other storage locations. By replicating data in this manner, the data can be replicated more quickly across distributed storage locations and the user more quickly notified that the data has been written. Additionally, by performing an initial write for the data followed by iterative evaluation of predicted access costs to perform data replication in the background, distributed implementation of such data replication is facilitated.

In one embodiment, such a distributed storage comprises a plurality of storage devices having a plurality of storage volumes and coupled to a plurality of servers. The servers implement access to the files on the storage volumes by tracking a read access cost and a write access cost for access by one of the servers to each of the plurality of storage volumes. For a requested file a server determines a read mirror set of the plurality of storage volumes on which the requested file is replicated from file location information associated with the requested file, selects a least cost member of the read mirror set of storage volumes as a source storage volume and reads the requested file from the source storage volume. For a request to store the file, the server determines a write mirror set of the plurality of storage volumes for the file from a storage plan associated with the file, selects a least cost member of the write mirror set as a target storage volume for a first copy of the corresponding file, and stores the file to the target storage volume.

In certain embodiments, the server may also access the storage plan from a shared repository, update the write access costs for that server each time that server writes a file to the plurality of storage volumes, update the read access costs for that server each time that server reads a file to the plurality of storage volumes or update a shared database of volume status information with read access costs and write access costs for that server. The server may also update the file location information each time that server writes a file to the plurality of storage volumes and store updated file location information to a shared index of replicated files. The shared index of replicated files may include identifiers of files replicated on the plurality of storage volumes and corresponding storage locations of each of the identified files.

The read access costs and write access costs may include fixed read access costs, variable read access costs, fixed write access costs or variable write access costs. Selecting a least cost member of the read mirror set of storage volumes as the source storage volume may, in embodiments, thus comprise calculating a predicted read cost according to $aC_{RF}+(F_R/b*C_{RV})$ for each of the read mirror set of storage volumes, where a and b are constants, $C_{RF}$ is a moving average of fixed read costs and $C_{RV}$ is a moving average of variable read costs, $F_R$ is a file size of the requested file, and wherein the least cost member of the read mirror set of storage volumes is the member of the read mirror set of storage volumes with a lowest predicted read cost for that server.

Similarly, in certain embodiments, selecting a least cost member of the write mirror set of storage volumes as the target storage volume may comprise calculating a predicted write cost according to $nC_{WF}+(F_W/m*C_{WV})$ for each of the write mirror set of storage volumes, where n and m are constants, $C_{WF}$ is a moving average of fixed write costs and $C_{RV}$ is a moving average of variable write costs, $F_W$ is a file size of the corresponding file to be written, wherein the least cost member of the write mirror set of storage volumes is the member of the write mirror set of storage volumes with a lowest predicted write cost for that server.

In one embodiment, the server may execute a background process to replicate the file on at least one additional volume of the write mirror set of storage volumes. In particular, in certain embodiments, the background process may copy the corresponding file from a first volume of the write mirror set to a second volume of the write mirror set.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

A more complete understanding of embodiments of methods and systems and the advantages thereof may be acquired by referring to the following description, taken in conjunction with the accompanying drawings in which like reference numbers indicate like features and wherein.

DETAILED DESCRIPTION

Figure 1:
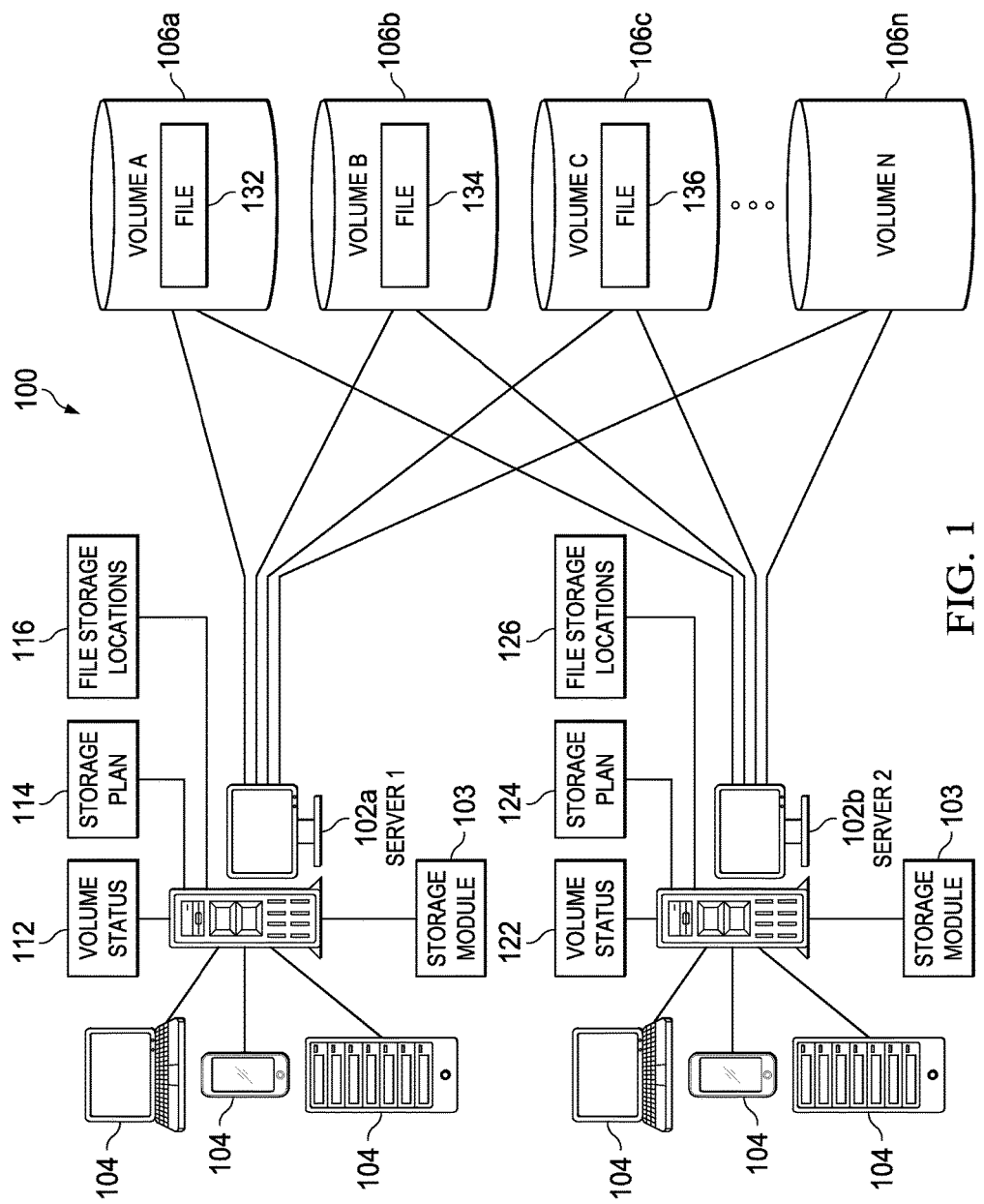
FIG. 1 is diagrammatic representation of one embodiment of a distributed computer system.

Systems and methods of data replication and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of this disclosure will become apparent to those skilled in the art from this disclosure.

Before delving into detail regarding specific embodiments, some brief context may be useful. As discussed above, data storage and replication in today's distributed data storage systems is inefficient at least in part because such data storage systems do not account for a variety of factors, including factors associated with the network in a distributed computer environment such as bandwidth availability or factors associated with the data access itself, such as the size of data being accessed or whether the access is a read or write. To ameliorate these inefficiencies and increase performance, embodiments of a data storage system as disclosed herein may maintain statistics or other data associated with storage locations of the system based on accesses to data at those storage locations. These statistics or other data may include the time it takes to read or write data on those storage locations. When data is accessed the statistics or other data can be utilized to predict an access cost associated with the data access for each of the storage locations. Such a predicted access cost may be correlated with a predicted time to perform the requested data access using the associated storage location. Storage locations to use in performing the requested data access can be selected based on the predicted access costs associated with each storage location. When performing the requested data access the statistics or other data associated with that selected storage location can be updated. Thus, the statistics or other data (and the calculated accesses costs) for each of the storage locations are periodically adjusted.

As may be imagined, in a distributed storage environment there may be a number of servers that can process data access requests. The factors which may affect data access in the distributed storage environment may also affect each of these servers differently (and may affect each server differently with respect to different storage locations). For example, the network bandwidth or time to access one storage location over the network from one server may differ greatly from the bandwidth or time to access that same storage location from a different server. In such distributed storage systems then, multiple servers may process a data access request from a client device.

Accordingly, embodiments as disclosed may maintain statistics or other data associated with storage locations within the distributed storage system at each server within the distributed storage systems. Thus, the statistics or other data (collectively statistics herein) maintained at each server may be particularized to that server with respect to each storage location (e.g., the statistics relate to data accesses from that particular server) and the resulting predicted access cost associated with a requested data access may be particular for the server servicing that requested data access. As the predicted access costs used to select a storage location in servicing a data access request at a server is particularized to that server, computer performance and efficiency is increased as access time may be decreased no matter the server that services a particular data access request.

Efficiency and computer performance may likewise be increased by performing data replication as a data access in the background according to substantially the same methodology. Specifically, when a data access specifies that data is to be written the server that initially receives the data access request may access the statistics or other data maintained at that server may be accessed, access costs for storage locations predicted, a storage location selected based on the predicted access costs and the data written to the selected storage location. The user can then be notified that the file has been written. The file can then be replicated to one or more additional storage location using the same methodology. In other words, predicted access costs for the other storage locations (e.g., the storage locations other than the initially selected storage locations) may be determined and a second storage location for the data may be selected based on the predicted access costs for the other storage locations. By replicating data in this manner, the data can be replicated more quickly across distributed storage locations and the user more quickly notified that the data has been written. Additionally, by performing an initial write for the data followed by iterative evaluation of predicted access costs to perform data replication in the background, distributed implementation of such data replication is facilitated.

In particular, embodiments of distributed storage systems may be implemented using an agent based architecture where agents deployed on multiple servers may be designated to service requests and may be coordinated through a centralized data repository. In such embodiments, the server that serviced the initial data access request from the client to write data may determine, after the write to the initial storage location, that the data should be replicated and initiate a request for data replication of that data. That data replication request may be serviced by an agent at another server. When servicing the request for data replication the predicted access costs for the other storage locations (e.g., the storage locations other than the storage location where the data was initially stored) may be determined based on statistics or other data associated with the particular server that is servicing the request. Accordingly here, computer performance and efficiency is increased because requests for data replication may be more quickly serviced (e.g., by any agent that is available to process such a request) but additionally, no matter the agent and server that process the request the data replication will be accomplished more quickly and efficiently as the determination of a storage location will be done based on a predicted access cost using statistics or other data associated with the particular server servicing the data replication request.

Turning now to FIG. 1, a diagrammatic representation of a distributed computer system is depicted. Distributed computer system 100 comprises a plurality of servers 102, client computing devices 104 and storage volumes 106 that may be logically or physically distributed such that they do not reside on the same computing device or do not reside in the same geographic location. Servers 102 and storage volumes 106 may comprise a distributed data storage system. In particular, servers 102 (e.g., server 102a, 102b) can receive and process requests (e.g., data access requests) from client computing devices 104 (mobile devices, laptop computers, desktop computers servers or other computing device) and access storage volumes 106 (e.g., storage volume 106a, 106b, 106c . . . 106n) on a plurality of storage devices. The storage volumes 106 can comprise a variety of storage types including, but not limited to, local drives, network file server volumes, cloud based storage volumes, storage area network (SAN) storage, database storage and other storage. It will be apparent with reference to FIG. 1 (and the rest of the figures herein) that while only a certain number of client computing devices 104, servers 102, storage volumes 106 or any other elements have been depicted, this is for purposes of illustration only and that more or fewer of these elements may be present in different embodiments.

Specifically, a storage module 103 on one or more of servers 102 may provide a user interface to client computer devices 104. Such an interface may, for example, be a browser based network interface that may be accessed and loaded by a browser executing on client computing device 104. Such a user interface may allow a user to perform administrative tasks associated with the distributed data storage system or perform data access requests such as to read data (also referred to herein as files) stored in storage volumes 106 or to store data (e.g., from client computer device 104) to storage volumes 106.

Storage module 103 on servers 102 may also maintain and access storage plans (e.g., storage plan 114 and storage plan 124). A storage plan can provide rules for storing a file such as the number of copies that should be stored and, in some embodiments, the storage volumes 106 that can be used to store that type of file (which may be all storage volumes 106 if none are specified). Different storage plans may apply to different types of documents. For example, a storage plan for financial documents may specify that three copies of the file are to be stored using storage volumes 106 while a storage plan for medical records may specify that two copies of that type of file are to be stored using storage volumes 106. A storage plan may for example, be specified by a user at a client computing device 104 using an interface provided by server 102. In embodiments, storage plan 114 and storage plan 124 may be kept synchronized and may include substantially the same data (excepting for example, between synchronizations, etc.).

Storage module 103 on servers 102 may also maintain the information used to connect to, and interact with, the storage volumes 106 to which the server 102 has access. In one embodiment, storage modules 103 can maintain volume status information that provides an indication of the time it takes that storage module 103 at the server 102 to read and write files to the various storage volumes 106. Storage module 103 on server 102a, for example, can maintain volume status information 112 that includes the statistics or other data associated with the access cost (such statistics or other data may be referred to as access cost values or cost values) of server 102a to each storage volume 106a-106n (or some subset thereof) and storage module 103 on server 102b can maintain volume status information 122 that includes statistics or other data associated with the access cost of server 102b to each storage volume 106a-106n (or some subset thereof). The volume status information may also include other status information, such as whether a storage volume 106 is online or offline or other status information.

The volume status information for a server 102 can include volume access costs values that provide a measure of the time it takes a server 102 to access a volume 106. Each server 102 can track the cost values, adjusting the costs as the system runs. As discussed, these cost values are not necessarily the same for each server 102 as, for example, the computing systems and devices may be distributed in a wide area network and in some instances over a wide geographic area. Access times may vary significantly over such networks because of differences in hardware, software, and/or network bottlenecks.

Storage module 103 on servers 102 may also access file storage location information (e.g., file storage location information 116 and file storage location information 126). File storage location information provides an index of storage volumes 106 at which each file is stored (e.g., may specify that a particular file is stored on volumes 106a and 106b, another file is stored at storage volumes 106b and 106c, etc.). The file storage location information can be used by a storage module 103 on server 102 to locate a requested file. The file storage location information can be propagated between servers 102 so that each server 102 has updated file storage location information. In embodiments such as these then file storage locations 116 may be kept synchronized with file storage locations 126 and thus, file storage locations 116 may include substantially the same data (excepting for example, between synchronizations, etc.). The file storage location information may contain other data on the files as well, such as, for example their size.

In one particular embodiment, the files storage locations 116, 126, volume status 112, 122 and storage plan 114, 124 can be stored at server 102 in a location associated with storage module 103. This location may include a cache or other location associated with storage module 103 which may be held, for example, in memory at the server 102. By holding such data in memory at server 102 faster processing may result as such data may be accessed more quickly. In embodiments such as these, files storage locations, volume status and storage plans may also be stored in a centralized data store (not shown). Storage module 103 may thus interact with the respective files storage location, volume status and storage plan stored in memory at that server 102 while servicing received requests and periodically update such a centralized data store with the respective files storage location, volume status and storage plan from memory at the server 102. Utilizing such an arrangement if a fault occurs with server 102 (e.g., erasing data in memory) the files storage locations, volume status and storage plan may be restored to the server 102 from the centralized data store. Additionally, by maintaining data associated with all servers 102 and storage volume 106 in a centralized location they may be used to give an administrator a holistic view of the status and health of the distributed data storage system.

In any event, a user at a client computing device 104 may utilize the interface provided by storage module 103 to read files from storage volumes 106 or write (store) files to storage volumes 106. When writing a file to storage volume 106, storage module 103 on server 102 can access the storage plan at that server 102 (e.g., storage plan 114 or storage plan 124) to determine the number of copies to be made based on the file. For example, when requesting that a file be stored using the interface provided by the storage module 103, the user may designate the type and location of the file (e.g., on the user's client device 104). The request to write data received through the interface may therefore include the type and size of the file to be written. Storage module 103 can then access the storage plan 114, 124 to determine the storage plan associated with the type of the file. The storage plan may include a number of copies of this type of file to be maintained by the distributed data storage system and, in some embodiments the write mirror set (the set of volumes 106 on which the type of file may be stored) of storage volumes 106 to which the file may be stored or replicated.

Storage module 103 on server 102 can analyze the volume access cost data in the volume status on the server 102 (e.g., volume status 112 or volume status 122) to determine and select the least cost storage volume 106 of the write mirror set (e.g., as determined by accessing the storage plan) as the target storage volume 106 to which the initial copy of the file will be written. Once the least cost storage volume 106 of the write mirror set associated with the file type has been determined and selected, the file is received from the client computer device 104, stored in the selected least cost storage volume 106 and the file storage location (e.g., file storage location 116 or file storage location 126) updated by associating the volume 106 on which the file was stored with the file. This storage may, for example, be accomplished by requesting or accessing the file from the interface on the client computing device which sends the file to be written to the storage module 103 at the server 102, which in turn stores the file on the least cost storage volume 106. Additionally, volume status information (e.g., volume status 112 or volume status 122) may be updated with data (e.g., statistics) tracked while storing the file in the storage volume 106.

According to one embodiment, the writing of the file can be handled entirely in volatile memory of the server 102 without storing the file in persistent storage of the server 102 using a pipelined process at the server 102. Advantages of handling file writes in volatile memory are many, including reduced overall file storage time (memory access times associated with volatile memory tend to be lower than those associated with hard disk storage), reduced complexity, and reduced hard drive space.

Once the initial copy of the file is written to the selected least cost storage volume 106 the user may be informed through the interface that the file has been written and, from a user's perspective, the request to store the file has been accomplished (e.g., according to any storage plan associated with that file type). The storage plan at that server 102 (e.g., storage plan 114 or storage plan 124) may, however, specify that a number of copies are to be of that type of file. Any additional copies (e.g., more than the one copy initially stored on the selected least cost storage volume) can then be made asynchronously in the background in a similar manner to the initial copy of the file.

Specifically, in one embodiment, a data replication request may be made for the file. This data replication request may identify the file to be replicated (and may include other data such as an identifier for a storage plan associated with the file). A storage module 103 can then receive the data replication request and access the storage plan 114, 124 associated with the type of the file to determine the number of copies and write mirror set to be used for that file. Storage module 103 may also access the file storage locations (e.g., file storage location 116 or file storage location 126) to determine the number of copies of the file that are currently stored on the storage volumes 106 and the storage volumes 106 on which the copies of the file are currently stored.

Storage module 103 can then analyze the storage volumes 106 of the write mirror set of storage volumes 106 (as determined from the storage plan) on which the file is not currently stored (as determined using the locations on which the file is stored from the file storage location) to determine a least cost storage volume 106. Specifically, storage module 103 on server 102 can analyze the volume access cost data in the volume status on the server 102 (e.g., volume status 112 or volume status 122) to determine and select the least cost storage volume 106 of the write mirror set on which the file is not currently stored as the target storage volume 106 to which a copy of the file will be written. Once this least cost storage volume 106 has been determined and selected, the file may be stored in this selected least cost storage volume 106 and the file storage location (e.g., file storage location 116 or file storage location 126) updated by associating the volume 106 on which the file was stored with the file. Additionally, volume status information (e.g., volume status 112 or volume status 122) may be update with data (e.g., statistics) tracked while storing the file in the storage volume 106.

This storage may, for example, be accomplished by requesting or accessing the file one of the storage volumes 106 on which the file is currently stored (e.g., as determined from the file storage location). In one embodiment, storage module 103 at the server 102 may determine a read mirror set of storage volumes (the set of volumes 106 on which the type of file is stored) from the file storage location information (e.g., file storage location information 116, 126), analyze the volume access cost data in the volume status (e.g., volume status 112 or volume status 122) to determine the least cost member of the read mirror set of storage volumes, select the least cost member as the source storage volume and read the file from the source storage volume 106. Volume status information (e.g., volume status 112 or volume status 122) may be update with data (e.g., statistics) tracked while reading the file in the storage volume 106. The file can then be stored on the least cost storage volume 106 selected to write the file. At this point, if storage module 103 determines that any additional copies of the file are required (e.g., using the file storage locations and the storage plan associated with the file) another data replication request for the file may be made by the storage module 103.

A request to read a file may be accomplished in a substantially similar manner. When a request is received through the interface to read a file from storage volumes 106, storage module 103 on server 102 can determine the read mirror set of storage volumes (the set of volumes 106 on which the type of file is stored) from the file storage location information (e.g., file storage location information 116, 126), analyze the volume access cost data in the volume status (e.g., volume status 112 or volume status 122) to determine the least cost member of the read mirror set of storage volumes, select the least cost member as the source storage volume and read the file from the source storage volume 106. The file can then be provided to the user at the client computing device 104 (e.g., through the interface). Volume status information (e.g., volume status 112 or volume status 122) may be update with data (e.g., statistics) tracked while reading the file in the storage volume 106. According to one embodiment, the process of reading a file can be handled entirely in volatile memory of the server 102 without storing the file in persistent storage of the server 102 using a pipelined process at the server 102.

It may be useful to an understanding of certain embodiments to illustrate examples of reading and writing data using embodiments of such a distributed storage system. As a first example, storage server 102a can receive a request from client computing device 104 to store a file through an interface provided by storage module 103. Assume for purposes of this example that the file to be stored is a file of type "alpha" and storage plan 114 specifies that for files of type "alpha" three copies should be made using storage volumes 106a, 106b, 106c or 106n. In this example, storage module 103 at storage server 102a can access volume status data 112 and determine that the least cost storage volume for server 102a is storage volume 106a. Storage server 102a can then write the first copy of the file 132 to storage volume 106a and update file storage location information 116. Storage module 103 on server 102a can also update volume status information 112 with data tracked while storing the file from server 102a to the storage volume 106a.

The two remaining copies of the file 134, 136 can be made at a later time. According to one embodiment, a background process of storage module 103 on server 102a (or another server) can copy the first copy of the file 132 from storage volume 106a to storage volumes 106b and storage volume 106c. The process of copying the file may include reading the file from the least cost storage volume 106 on which a copy of the file is stored and writing the file to the least cost storage volume in the write mirror set on which a copy of the file is not yet stored.

To continue with the above example then, storage module 103 on server 102a may make a data replication request identifying the file 132 and the storage plan "alpha" associated with the file 132. This data replication request may be placed in a queue that may be service by background processes of storage modules 103 on servers 102. Assume further then that storage module 103 on server 102b obtains the data replication request (e.g., from the request queue) and access storage plan 124 to determine the number of copies of files associated with storage plan "alpha" (in this example three) and the write mirror set to be used for that type of file (in this example storage volumes 106a, 106b, 106c or 106n). Storage module 103 may also access the file storage locations 126 to determine the number of copies of the file that are currently stored on the storage volumes 106 and the storage volumes 106 on which the copies of the file are currently stored (here, one copy stored on storage volume 106a).

Storage module 103 on server 102b can then analyze the storage volumes 106 of the write mirror set of storage volumes 106 on which the file is not currently stored (in this example storage volumes 106b, 106c and 106n), to determine a least cost storage volume 106 of those storage volume 106. Specifically, storage module 103 on server 102b can analyze the volume access cost data in the volume status 122 to determine and select this least cost storage volume 106. In this example, storage module 103 at storage server 102b can access volume status data 122 and determine that the least cost storage volume for server 102b is storage volume 106b. Storage server 102b can then write the second copy of the file 132 to storage volume 106b and update file storage location information 126. Storage module 103 on server 102b can also update volume status information 122 with data tracked while storing the file from server 102b to the storage volume 106b. The storage module 103 on server 102b may then queue a data replication request as a third copy of the file is still needed according to storage plan "alpha." The third copy of the file 136 can be made in substantially the same manner using based on this data replication request.

Now, say storage server 102b receives a request to read the file. Server 102b can access file storage locations 126 to determine that copies of the file are stored at storage volumes 106a, 106b and 106c. Server 102b can determine the least cost storage volume of the storage volumes 106a, 106b and 106c from which to read the file using volume status 122 and read the file from the least cost volume. Storage module 103 on server 102b can also update volume status information 122 with data tracked while reading the file from the least cost storage volume 106.

It will now be useful to delve into more details regarding the volume status information that may be tracked and maintained for each storage volume 106. Storage module 103 at each server 102 can track the time it takes that server 102 to perform an operation on a storage volume 106 using four separate cost values for each volume 106: fixed read, variable read, fixed write and variable write. The fixed cost is the time (e.g., in milliseconds) it takes to open/create a file on the volume. A fixed write cost for a volume 106 may therefore be the time it takes to create a file on that storage volume 106 (e.g., before any data is transferred) while a fixed read cost for a volume 106 may be the time it takes to open a file on that storage volume 106. The variable cost tracks how much it costs (e.g., time per unit of data, such as milliseconds per kilobyte) to transfer data (e.g. read or write) to/from the volume. Tracking the fixed and variable costs separately results in consistent performance numbers independent of file size. Additionally, read and write costs may be tracked separately because they can vary significantly on some types of devices (e.g. Flash memory storage devices, and optical systems) on which storage volumes 106 are implemented.

Thus, to determine a least cost storage volume for a write, a predicted write cost may be determined for all the storage volumes 106 of a write mirror set. The predicted write costs for the storage volumes 106 is then use to select the least cost storage volume 106. A predicted write cost of a storage volume can be determined as $nC_{WF}+(F_W/m*C_{WV})$ where 'n' and 'm' are constants, $C_{WF}$ is a moving average of fixed write costs for that storage volume and $C_{WV}$ is a moving average of variable write costs for that storage volume and $F_W$ is a file size of the corresponding file to be written. According to one embodiment, the predicted write cost can be $C_{WF}+(F_W/1024*C_{WV})$. For a write operation, the least cost volume can be the volume with the lowest predicted write cost.

To determine a least cost storage volume for a read, a predicted read cost may be determined for all the storage volumes 106 of a read mirror set. The predicted read costs for the storage volumes 106 is then use to select the least cost storage volume 106. A predicted read cost for a storage volume can be determined as $C_{RF}+(F_R/b*C_{RV})$, where 'a' and 'b' are constants, $C_{RF}$ is a moving average of fixed read costs and $C_{RV}$ is a moving average of variable read costs, $F_R$ is a file size of the requested file. In one embodiment the predicted read cost can be $C_{RF}+(F_R/1024*C_{RV})$. For a read operation, the least cost volume for a read operation can be the volume with the lowest predicted read cost.

The read cost values and write cost values for a storage volume used to determine a predicted read cost or predicted write cost for a storage volume can be moving averages of the specified value. The value of the moving average may be updated once for each interval. According to one embodiment, a storage module 103 on server 102 calculates two moving averages for each measurement:

Minute—this is the moving average of the cost taken every minute over a 60 minute interval. The value of the moving average will change once each minute.

Day—this is the moving average of the cost taken every day over a 30 day interval. The value of this moving average will change once each day.

For each of these moving averages, the interval sample total and the interval sample count can be persisted in the volume status. At the end of each sample interval the moving average is updated with the new sample. The new sample value (S) is the average over the sample interval and is calculated as the interval sample total divided by the interval sample count.

This interval sample value is used to calculate the new moving average using the formula below (where A is the moving average, S is the interval sample value and N is the number of intervals included in the moving average): $A_t = ((N-1)*A_{t-1}+S_t)/N$. The moving average of the read and write costs for a particular storage volume can be used for predicting the read or write costs for a particular file in conjunction with that storage volume.

Figure 2:
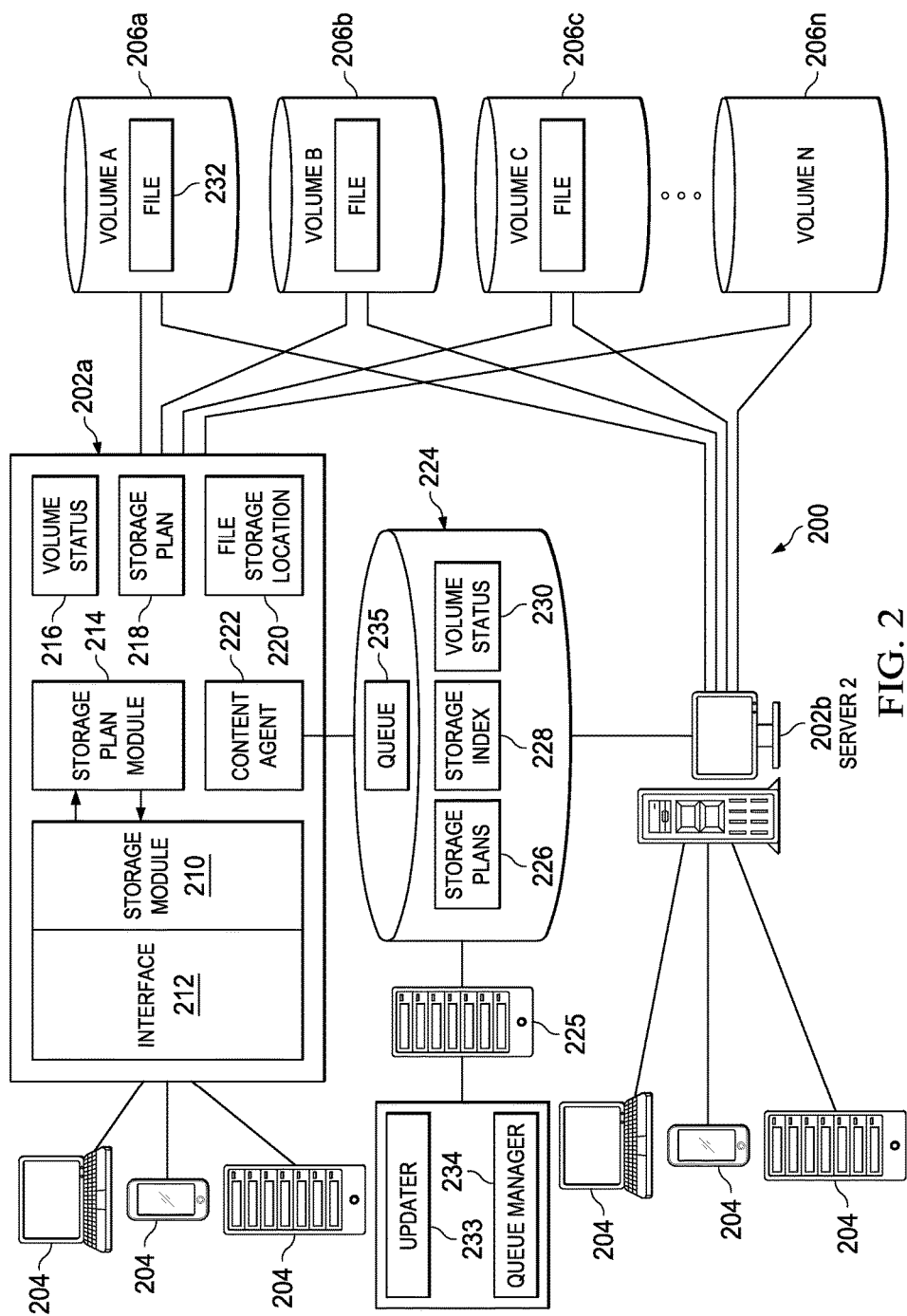
FIG. 2 is diagrammatic representation of another embodiment of a distributed computer system.

FIG. 2 is a diagrammatic representation of one embodiment of a distributed computer system 200 comprising a plurality of servers 202 (e.g., server 202a, 202b) that can receive and process requests from client computing devices 204 (mobile devices, laptop computers, desktop computers servers or other computing device) and access storage volumes 206 (e.g., storage volume 206a, 206b, 206c . . . 206n). Servers 202 and storage volumes 206 may serve to implement a distributed data storage system. According to one embodiment, servers 202 can be storage servers that retrieve and store files for client computing devices 204 where files may be replicated across multiple storage volumes 206.

The storage volumes 206 can comprise a variety of storage types including, but not limited to, local drives, network file server volumes, cloud based storage volumes, storage area network (SAN) storage, database storage and other storage. Each server 202 may maintain the information used to connect to and interact with the storage volumes 206 to which the server has access.

As an example, server 202a may include a storage module 210 providing an interface 212, such as a representational state transfer (REST) interface or other interface, through which a user at client computing devices 204 can interact with server 202a to request files and to upload files or create files using server 202a. Storage module 210 can access storage plan module 214 that provides processes for accessing storage volumes 206. While not shown, it will be apparent that server 202b and other severs in the distributed storage system (not shown) may be configured similarly to server 202a.

Storage plan module 214 can maintain volume status information 216 that provides an indication of the time it takes server 202*a* to read and write files to the various storage volumes 206. Storage plan module 214 on server 202*a* can track the costs, adjusting the costs as the server 202*a* runs. Volume status information 216 may also include other information, such as whether a storage volume 206 is online or offline or other status information. As discussed, these cost values are not necessarily the same for each server 102 as, for example, the systems may be distributed in a wide area network and in some instances over a wide geographic area. Access times may vary significantly over such networks because of differences in hardware, software, and/or network bottlenecks.

Storage plan module 214 on server 202*a* may also access storage plan 218. Storage plan 218 can provide rules for storing a file such as the number of copies that should be stored and the storage volumes that can be used. Different storage plans may apply to different types of files.

Storage plan module 214 on server 202*a* may also access file storage location information 220. File storage location information 220 provides an index of where files are stored on storage volumes 206 and may provide other data such as the size of the file. File storage location information 220 can be used by storage plan module 214 or other module on server 202*a* to locate a file. The index may include references identifying storage volumes 206 on which a requested file is stored.

When reading a file, storage plan module 214 can determine the set of storage volumes 206 on which the file is stored from file location information 220 and the least read cost storage volume on which the file is stored from volume status data 216. Storage plan module 214 can read the file from the least read cost storage volume 206. In another embodiment, storage plan module 214 may pass the connection information to storage module 210 or another application so that storage module 210 or other application can read the file and then provide the file to a client computing device 204.

As may be apparent, in many cases the same volume or set of volumes may continue to be selected as a least cost read storage volume. This situation may result in infrequent updates of the volume status 216 associated with other storage volumes 206. To address this situation, at some time interval, or randomly, storage plan module 214 may select a storage volume 206 at the least read cost storage volume that does not actually have the lowest predicted read cost. Additionally, if two storage volumes 206 have a similar (or within some threshold) predicted read cost storage plan module 214 may select one at random or on a round robin schedule.

When writing a file, storage plan module 214 can identify the least write cost storage volume from the storage volumes identified in storage plan 218 and write an initial copy of the file to the least write cost storage volume. For example, if storage plan 218 specifies that three copies of a file should be made using storage volumes 206*a*, 206*b*, 206*c* or 206*n*, server 202*a* can access volume status data 216 and determine that the least write cost storage volume for server 202*a* is storage volume 206*a*. Storage server 202*a* can then write the first copy of the file 232 to storage volume 206*a* and update file storage location information 220 and volume status 216. The update may include the remaining number of copies of the file that need to be made or other indication that the file requires replication.

Similarly to the situation discussed above with respect to read requests, to address a condition of infrequent updated of volume status 206 with respect to certain storage volumes 206 in certain situations, at some time interval, or randomly, storage plan module 214 may select a storage volume 206 at the least write cost storage volume that does not actually have the lowest predicted write cost. Additionally, if two storage volumes 206 have a similar (or within some threshold) predicted write cost storage plan module 214 may select one at random or on a round robin schedule.

Content agent 222 can be responsible for replicating files written to storage volumes 206, in some instances, after the first copy of the file 232 is written to a storage volume (such as storage volume 206*a*). According to one embodiment, content agent 222 can run as a background process that determines which files require replication. Content agent 222 may run on a periodic basis to determine if any files need replication. This determination may be made by accessing file storage location 220 to determine the stored files and the number of copies of each file that are stored in volumes 206, and for each of those files accessing the corresponding storage plan 218 to determine if the number of copies of the file that are stored on volumes 206 is equal to (or greater than) the number of copies specified for that type of file by the associated storage plan 218.

If content agent 222 determines that a file requires replication, content agent 222 can access storage location information 220 to determine the storage volumes on which copies of the file are stored and the locations to which the file can be replicated (e.g., as specified by the storage plan 218). Content agent 222 can make a data replication request that storage plan module 214 copies the file from a storage volume on which the file is currently stored to another storage volume. In some embodiments, storage plan module 214 can treat the request as a read and write request, reading the file from the lowest read cost storage volume on which the file is stored and writing the file the lowest write cost storage volume to which the file can be replicated according to the storage plan. In this way, storage plan module 214 may continuously adapt and control read/write operations according the latest experienced read/write costs.

As discussed above, a server can use write access costs and read access costs to determine the least cost storage volume. The write access costs and read access costs may be computed each time a file is written to or read from a storage volume. In other embodiments, the read access costs and write access costs may be updated at times other than write/read operations and may be updated according to different schedules. According to one embodiment, for write operations, the server 102 may pass a stream object that is the file to be written to a storage plan module 214. The storage plan module 214 implements a copy loop that reads the content from the source stream and writes it to the storage volume 206. The time it take may be tracked (e.g., separately for fixed and variable costs).

In some read operations, however, the information to connect to a read storage volume 206 may be passed from the storage plan module 214 to another application or process (such as a web server application) so that the other application or process handles reading the file from a storage volume 206. This may be particularly useful for large files. However, in this case, the file may pass through a web server or other application's memory and not the memory of the storage plan module. Consequently, the storage plan module 214 may not be aware of how long it takes files to be read from various volumes. To address this issue, the storage plan module 214 can select small files on a storage volume 206 and read the files into memory of the server 202, measuring fixed and variable read access costs. This process can be done for files under a configurable file size limit. The variable costs obtained from reading smaller files can be used to predict the variable costs of reading larger files from the same volume 206.

According to one embodiment, servers 202 may share information used to manage replication of files. To this end, one or more centralized data sores or repositories 224 and associated server 225 may be maintained that include storage plans 226, a storage index 228 and volume status data 230. Storage plans 226 can include the storage plans used throughout the distributed computer system 200. Storage index 228 can include an index of the storage locations of files written by servers 202 so that, for example, server 202b can determine the locations of files that were stored by server 202a.

Similarly, volume status information 230 can include volume status information for the server 202. Volume status information 230 can include information such as the access costs for each server 202 to each storage volume 206 (in some cases by multiple intervals, as discussed in conjunction with FIG. 1), consumption (the rate at which capacity for a volume is being consumed, in some cases by multiple intervals), whether a storage volume 206 is online or offline and other status information.

According to one embodiment, volume status information 230 can be updated each time a file is written to a volume. This strategy, however, may lead to database contention between servers (or threads within a server). To avoid this contention, each server 202 can update a local, in-memory copy of the volume status information (e.g., server 202a can update volume status information 216). Periodically, each server 202 can write updates from the local volume status information to volume status information 230.

In one particular embodiment, the files storage locations 220, volume status 216 and storage plan 218 are stored at server 202a in a location in memory. This location may include a cache or other location associated with storage module 210, storage plan module 214 or content agent 222 which may be held, for example, in memory at the server 202a. Thus, storage module 210, storage plan module 214 and content agent 222 may interact with file storage locations 220, volume status 216 and storage plan 218 stored in memory at server 202a while servicing received requests and periodically update centralized data repository 224 with file storage locations 220, volume status 216 and storage plan 218 from memory at the server 202a. Specifically, storage plan module 210 may communicate with file storage locations 220, volume status 216 and storage plan 218 to updater module 233 on data repository server 225. Updater module 233 may update storage plans 226, storage index 228 and volume status 230 at centralized repository 224 with the data from with file storage locations 220, volume status 216 and storage plan 218. Utilizing such an arrangement if a fault occurs with a server 202 (e.g., erasing data in memory) the files storage locations, volume status and storage plan for that server 202 may be restored to the server 202 from the centralized data store 224. Additionally, by maintaining data associated with all servers 202 and storage volume 206 in a centralized location they may be used to give an administrator a holistic view of the status and health of the distributed data storage system.

Centralized data repository 224 and repository server 225 may also be used to coordinate the operation of content agents 222 on servers 202. As discussed, content agent 222 can be responsible for replicating files written to storage volumes 206 after the first copy of the file 232 is written to a storage volume (such as storage volume 206a). According to one embodiment, content agent 222 can run as a background process that determines which files require replication. Content agent 222 may run on a periodic basis to determine if any files need replication. This determination may be made by accessing file storage location 220 to determine the stored files and the number of copies of each file that are stored in volumes 206, and for each of those files accessing the corresponding storage plan 218 to determine if the number of copies of the file that are stored on volumes 206 is equal to (or greater than) the number of copies specified for that type of file by the associated storage plan 218.

If content agent 222 determines that a file requires replication, content agent 222 can access storage location information 220 to determine the storage volumes on which copies of the file are stored and the locations to which the file can be replicated (e.g., as specified by the storage plan 218). Content agent 222 can make a data replication request.

In one particular embodiment, it may be desired that content agents 222 distribute the workload associated with replication of files in the distributed data system. Accordingly, in such embodiments, when content agent 222 determines that a file on server 202 requires replication it may send a data replication request to queue manager 234 on data repository server 225. Queue manager 234 may insert the received data replication request into request queue 235. Content agents 222 on servers 202 may therefore contact queue manager 234 on a periodic basis to obtain one or more data replication requests in queue 235. When a content agent 222 interacts with queue manager 234 and obtains data replication requests, for each data replication request the content agent 222 may interact with the storage plan module 214 on the server 202 to copy the file from a storage volume on which the file is currently stored to another storage volume.

In this manner, no matter the server 202 that initially received a request to store a file (e.g., from an interface at a client computing device 204) and initially stored that file, the replication of that file may be both performed in the background and the work of such data replication may be distributed among content agents 222 on different (or the same) server 202. In certain embodiments, therefore, it may be desired to attempt to evenly distribute such data replication tasks across content agents 222. Accordingly, in one embodiment, when content agent 222 forms a data replication request it may generate a random number within a certain range and associate that random number with the data replication request such that the random number is associated with the data replication request in the queue 235.

Each content agent 222 may be assigned a corresponding portion of the number range (of random numbers). This assignment may be made, for example, by coordination between an agent service managing content agents 222 on the server 202, by queue manager 234 or through some other assignment methodology. When a content agent 222 on a particular server 202 contacts queue manager 234 the portion of the range associated with the content agent 222 may be determined. The data replication requests associated with random numbers that fall within the portion of the range corresponding to that content agent 222 may be determined and provided to that content agent 222. In this manner, workload associated with the servicing of such data replication requests may be substantially evenly distributed among active content agents 222. Moreover, in such embodiments, if a server 202 goes offline and a content agent 222 on that server 202 becomes unavailable, the range of random numbers may be re-apportioned among the remaining active content agents such that the entire range of random number is covered by the remaining content agents 222.

It will be apparent that not all modules may be deployed on all servers in a distributed storage system, in particular in some embodiments certain servers may be utilized for servicing requests for client device without a content agent deployed thereon and other servers (which may be referred to as data replication servers) may have content agents deployed thereon.

Figure 3:
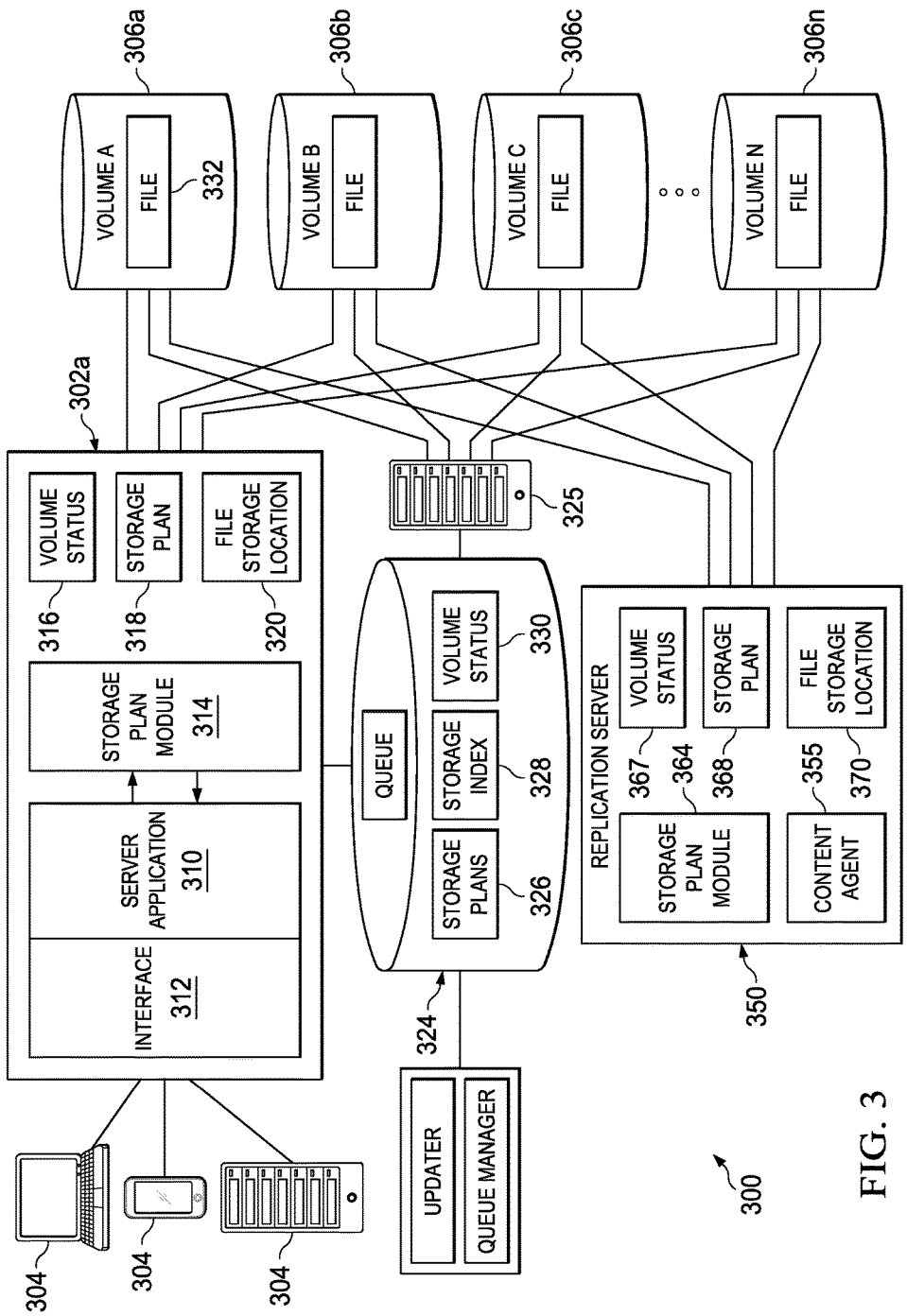
FIG. 3 is diagrammatic representation of another embodiment of a distributed computer system.

FIG. 3 is a diagrammatic representation of one embodiment of a distributed computer system 300 comprising a plurality of servers 302 (e.g., server 302, 325, 350) that can receive and process requests from client computing devices 304 (mobile devices, laptop computers, desktop computers servers or other computing device) and access storage volumes 306 (e.g., storage volume 306a, 306b, 306c . . . 306n). According to one embodiment, servers 302 can be storage servers that retrieve and store files for client computing devices 304. A file may be replicated across multiple storage volumes 306. Distributed computer system 300 may also include one or more replication servers 350 with content agents 355 deployed thereon responsible for replicating files stored on storage volumes 306 by that server 350 or other servers 302. In some cases replication server 350 may be a file server similar that handles replication of files stored other servers 302 and itself. Thus, for example, a server 302 can also be a replication server 350. A replication server 350 may be out-of-band with the request path between client devices 304, servers 302, and storage volumes 306.

The storage volumes 306 can comprise a variety of storage types including, but not limited to, local drives, network file server volumes, cloud based storage volumes, storage area network (SAN) storage, database storage and other storage. Each server 302 may maintain the information used to connect to and interact with the storage volumes 306 to which the server has access.

Using the example of server 302a, a server 302a may include an application 310 providing an interface 312, such a representational state transfer (REST) interface or other interface, through which client computing devices 304 can interact with server 302 to request files and to upload files or create files on server 302. Application 310 can interact with a storage plan module 314 that can provide processes for access storage volumes 306.

Storage plan module 314 can maintain volume status information 316 that provides an indication of the time it takes server 302 to read and write files to the various storage volumes 306. Server 302 can track the costs, adjusting the costs as the server 302 runs. Volume status information 316 may also include other information, such as whether a storage volume 306 is online or offline or other status information.

Server 302 may also access storage plan 318. Storage plan 318 can provide rules for storing a file such as the number of copies that should be stored and the storage volumes that can be used. Different storage plans may apply to different types of documents. Servers 302 may also access file storage location 320. File storage location information 320 provides an index of where files are stored on storage volumes 306. File storage location information 320 can be used by server 302 to locate a requested file.

When reading a file, storage plan module 314 can determine the set of storage volumes 306 on which the file is stored from file location information 320 and the least read cost storage volume on which the file is stored from volume status data 316. Storage plan module 314 can read the file from the least read cost storage volume. In another embodiment, storage plan module 314 may pass the connection information to storage module 310 or another application so that storage module 310 or other application can read the file and then provide the file to a client computing device 304.

When writing a file, storage plan module 314 can identify the least write cost storage volume from the storage volumes identified in storage plan 318 and write an initial copy of the file (represented by file 332) to the least write cost storage volume. For example, if storage plan 318 specifies that three copies of a file should be made using storage volumes 306a, 306b, 306c or 306n, server 302a can access volume status data 316 and determine that the least write cost storage volume for server 302a is storage volume 306a. Storage server 302 can then write the first copy of the file 332 to storage volume 306a and update file storage location information 320. The update may include the remaining number of copies of the file that need to be made or other indication that the file requires replication.

Replication server 350 can be responsible for replicating files stored on volumes 306. Replication server 350 can include a content agent 364, a storage plan module 364, volume status information 367, storage plan 368 and file storage location information 370. Content agent 355 can review file storage location information 370 and determine files to be replicated. If content agent 355 determines that a file requires replication, content agent 355 can determine the storage volumes on which copies of the file are stored from file storage location information 370. Content agent 350 can request that storage plan module 364 copy the file from a storage volume on which the file is currently stored to another replication storage volume. Storage plan module 364 can treat the request as a read and write request, reading the file from the lowest read cost storage volume on which the file is stored and writing the file the lowest write cost storage volume to which the file can be replicated according to the storage plan.

According to one embodiment, servers 302 and replication server 350 may share information used to manage replication of files. To this end, one or more centralized repositories 324 may be maintained that include storage plans 326, a storage index 328 and volume status data 330. Storage plans 326 can include the storage plans used throughout the distributed computer system 300. Storage index 328 can include an index of the storage locations of files written by servers 302 and replication server 350 so that, for example, server 302b can determine the locations of files that were stored by server 302a.

Volume status information 330 can include volume status information for the servers 302 and replication server 350. Volume status information 330 can include information such as the access costs for each server 302 to each storage volume 306 (in some cases by multiple intervals, as discussed in conjunction with FIGS. 1 and 2), consumption (the rate at which capacity for a volume is being consumed, in some cases by multiple intervals), whether a storage volume 306 is online or offline and other status information.

According to one embodiment, volume status information 330 can be updated each time a file is written to a volume. In another embodiment, each server 302 or replication server 350 can update a local, in-memory copy of the volume status information (e.g., server 302a can update volume status information 316). Periodically, the server 302 or replication server 350 can write updates from the local copy of the volume status information to volume status information 330.

Figure 4:
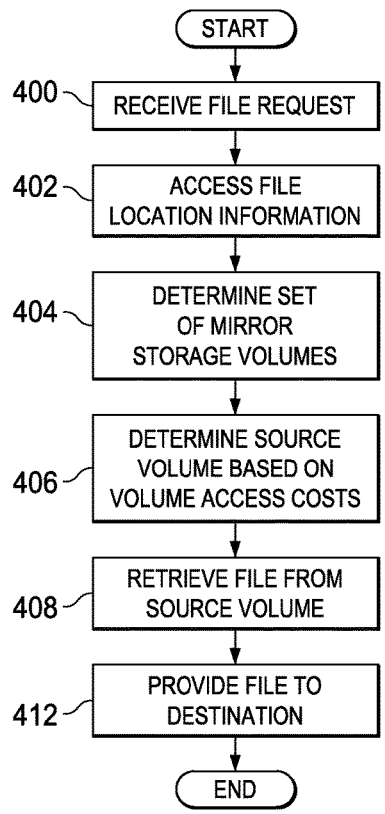
FIG. 4 is a diagrammatic representation of one embodiment of a method for reading a file replicated at multiple storage volumes.

FIG. 4 is a flow chart illustrating one embodiment of a method for reading a file that is replicated to multiple storage volumes. The method of FIG. 4 can be implemented through execution of code at a server (e.g., by storage plan module 214, 314, 364) or other computing device. When a request for a file is received (step 400), the server can access a set of file location information (step 402) and determine a read mirror set of storage volumes on which the file is replicated (step 404). The server can determine a source volume from which to read the file based on read access costs of the storage volumes in the read mirror set (step 406), retrieve the file from the source volume (step 408) and provide the file to a destination (step 412) (e.g., a requesting client device). The steps of FIG. 4 can be repeated as needed or desired.

Figure 5:
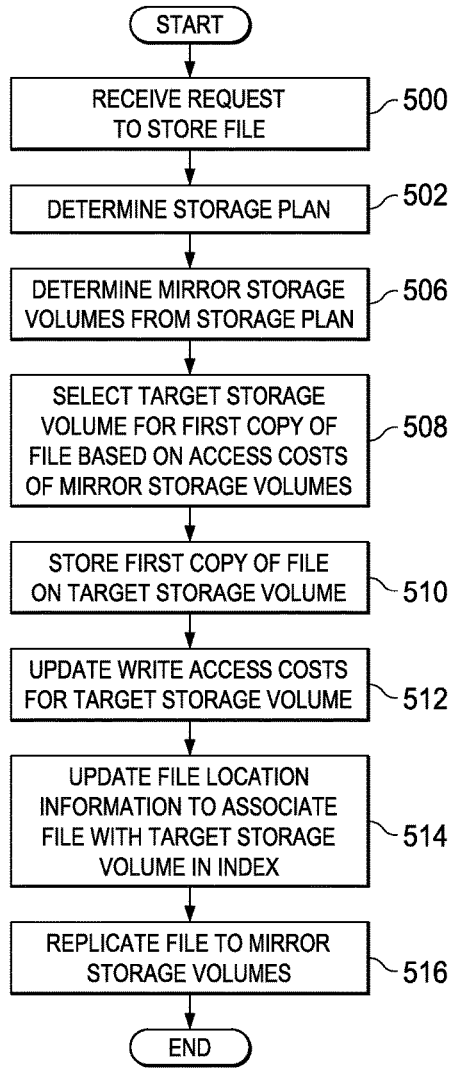
FIG. 5 is a diagrammatic representation of one embodiment of a method for writing a file to a storage volume.

FIG. 5 is a flow chart illustrating one embodiment of a method for writing a file that is to be replicated to multiple storage volumes. The method of FIG. 5 can be implemented through execution of code at a server or other computing device. When a request to store a file is received (step 500), the server can determine a storage plan for the file (step 502) and determine the set of write mirror storage volumes from the storage plan (step 506). The server can select the write mirror storage volume having the lowest write access cost as a target storage volume (step 508) and store a first copy of the file to the target storage volume (step 510). The write access costs for the target storage volume can be updated (step 512) and the file location information for the file can be updated (step 514). The file can also be replicated to other storage volumes in the set of write mirror storage volumes (step 516). The steps of FIG. 5 can be repeated as needed or desired.

Figure 6:
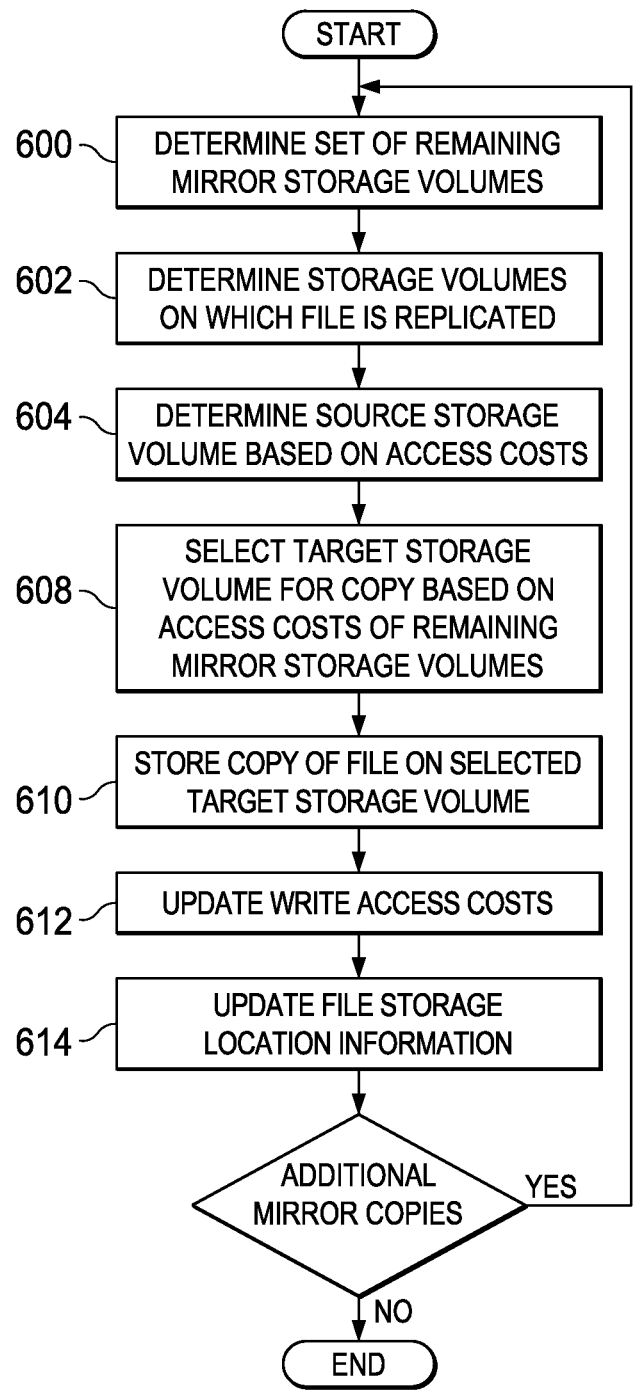
FIG. 6 is a diagrammatic representation of one embodiment of replicating a file.

FIG. 6 is a diagrammatic representation of one embodiment of a method for replicating a file. The method of FIG. 6 can be implemented through execution of code at a server or other computing device. For a file that has been stored on a storage volume that requires replication, the server can determine the set of remaining mirror storage volumes to which the file can be replicated (step 600) and the set of storage volumes on which the file is already stored (step 602). The server can select the storage volume on which file stored and that has the least read access cost as the source storage volume (step 604) and the storage volume in the set of remaining mirror storage volumes with the least write access cost as the target storage volume (step 608). The file can be copied from the source storage volume to the target storage volume (step 610), the access costs for the source or target storage volumes updated (step 612) and the storage location information for the file updated (step 614). The steps of FIG. 6 can be repeated until the file is fully replicated or as otherwise needed or desired.

Figure 7:
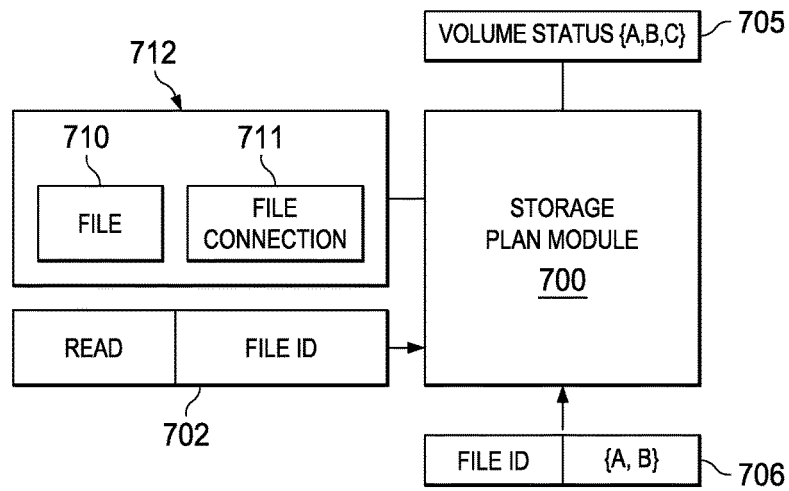
FIG. 7 is a diagrammatic representation of one embodiment of reading a file.

FIG. 7 is a diagrammatic representation of one embodiment of reading a file. A storage plan module 700 executing on a server or other computing device can receive a read request 702 for a file identifying the file. The storage plan module 700 can access file location information 706, which may be in-memory at the server. For purposes of this example, file location information 706 includes the file ID and designates that the file associated with the file ID is stored on volumes A, B. Storage plan module 700 may also access volume status information 705 (which may also be in-memory and include status information, for example, on volumes A, B, and C). From file location information 706, storage plan module 700 can determine the set of storage volumes on which the requested file is stored (e.g., volumes A and B) and from volume status information 705, the least read cost storage volume on which the requested file is stored. Storage plan module 705 can read the file 710 from the least read access cost storage volume into memory 712 and pass the file 710 to a requesting application. In another embodiment, storage plan module 700 passes the connection information 711 for the least read access cost storage volume to the requesting application or process or another storage plan module and the requesting application or process reads the file from the identified least cost storage volume.

Figure 8A:
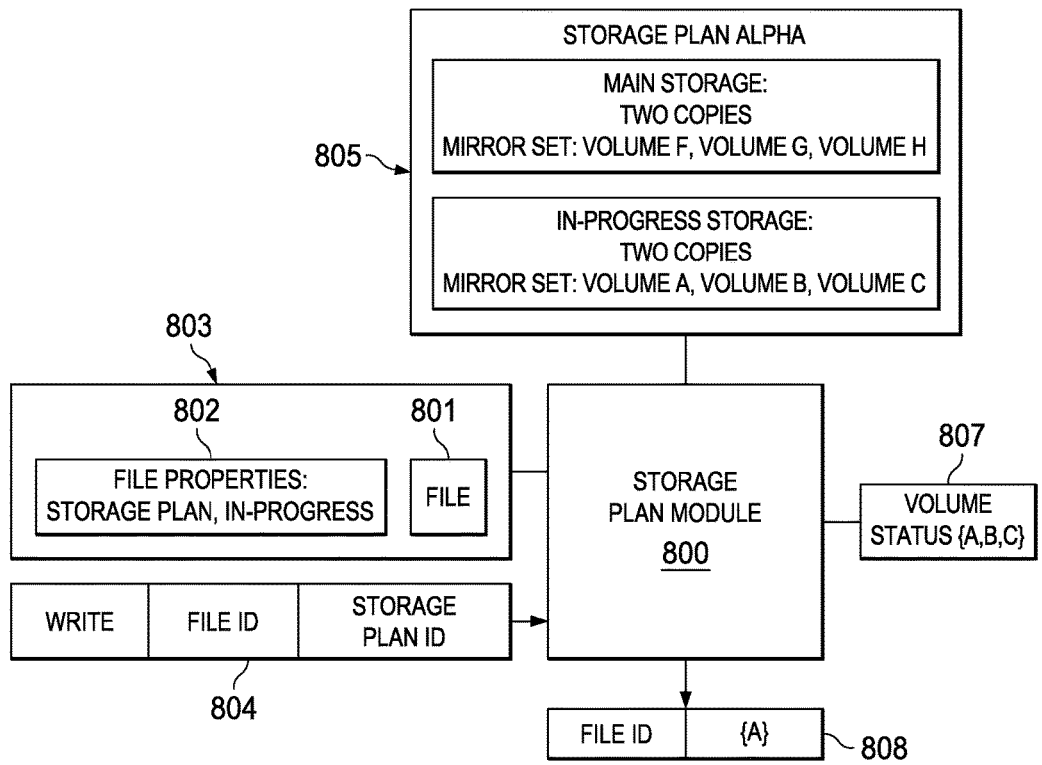
FIGS. 8A-8F are diagrammatic representations of one embodiment of writing and replicating a file.

FIGS. 8A-8F are diagrammatic representations of one embodiment of writing and replicating a file 801. FIG. 8A illustrates that a storage plan module 800 can receive a write request 804 to store file 801. File 801 may be streamed, or otherwise read, into memory 803 (e.g., from a client device to the memory of the server including storage plan module 800) and may include accompanying metadata 802, such as content management metadata or other metadata such as file type, storage plan identifier, size, etc. The request 804 can identify the file 801 and a storage plan or may identify the file and storage plan module 800 can determine the storage plan to use. In the embodiment of FIG. 8A, assume that the storage plan ID of request 804 has identifier storage plan "Alpha" 805 to use with the file identified by the file ID of the request 804.

Storage plans may specify the set of volumes to use for files associated with files. Moreover, in certain embodiment, a storage plan may specify different volumes or numbers of copies based on different state of the file. For example, in certain embodiments, an in-progress state may indicate that operations are currently being performed on a file while a main or committed state may indicate that content has been committed or stored to main storage of the system. In many cases it is desirable that different storage volumes be used for storage used by the system while it is in-process as in-process content is usually volatile and deleted very quickly.

Here, for example, storage plan 805 specifies that when the file is in an in-progress state (e.g., as indicated by metadata 802), 2 copies of the file should be stored using Storage Volumes A, B or C. Storage plan module 800 can access volume status information 807 to determine which storage volume (A, B or C) has the least write access cost. In this example, Storage Volume A has the least write access cost, and storage plan module 800 writes the file to Storage Volume A and generates a storage ticket 808 to update the index of file locations. Such a storage ticket 808 may, for example, be received by an updater at a centralized repository server and used to update a storage index at the centralized server.

Figure 8B:
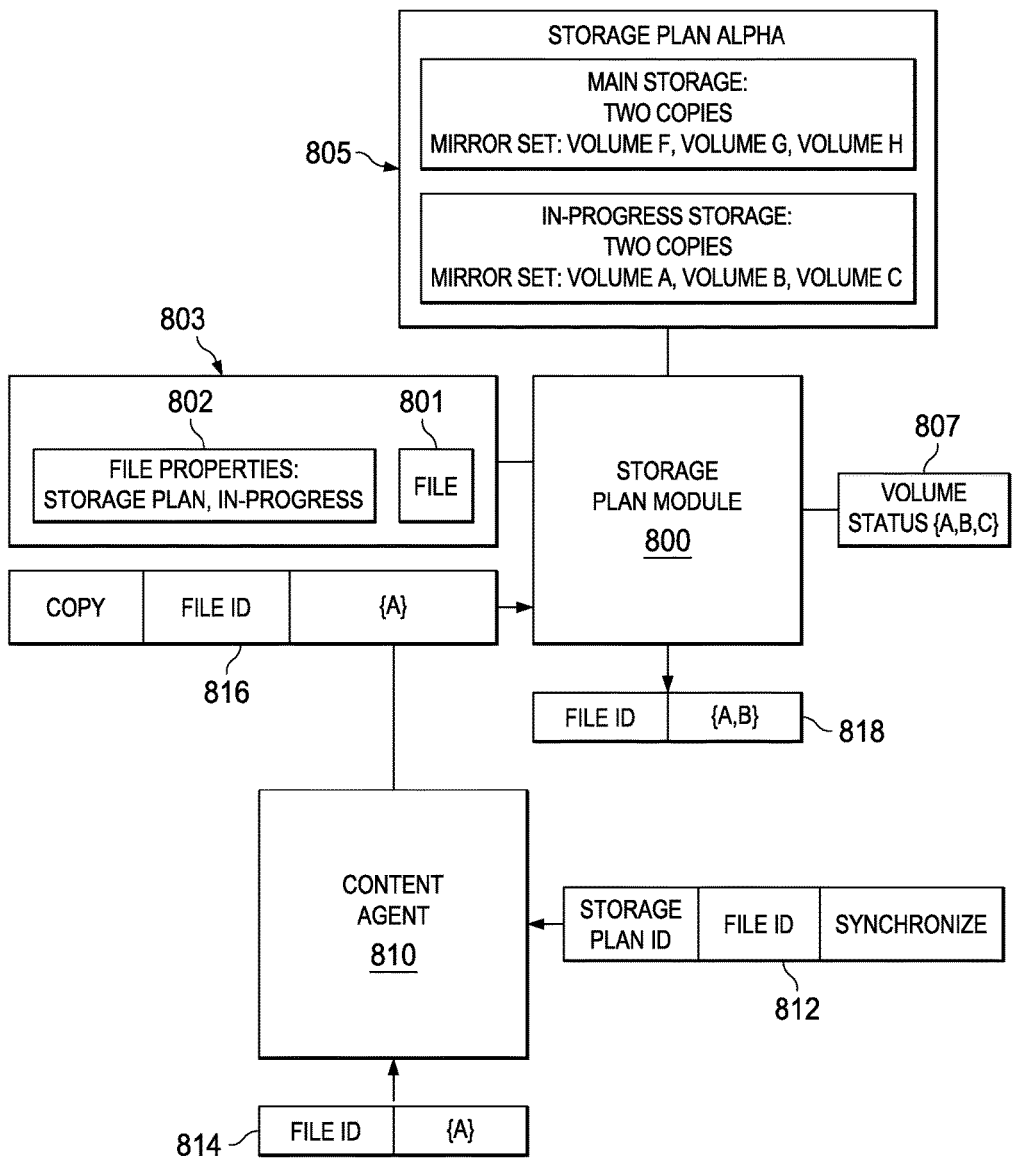

FIG. 8B illustrates that a content agent 810 can receive a synchronization request 812 that identifies the file to be synchronized. Content agent 810 can read the set of file location information 814 and generate a copy request 816 to storage plan module 800 to copy the file from a source volume (e.g., Storage Volume A). Storage plan module 800 can access volume status information 807 to determine which of Storage Volume B or Storage Volume C (the remaining storage volumes for replicating an in-progress file as specified by the appropriate storage plan 805) is the least write access cost storage volume and can write the file to the storage volume with the least write access cost. In this example, storage plan module 800 reads the file from Storage Volume A, writes the file Storage Volume B and generates a storage ticket 818 to update the file storage location information.

Figure 8C:
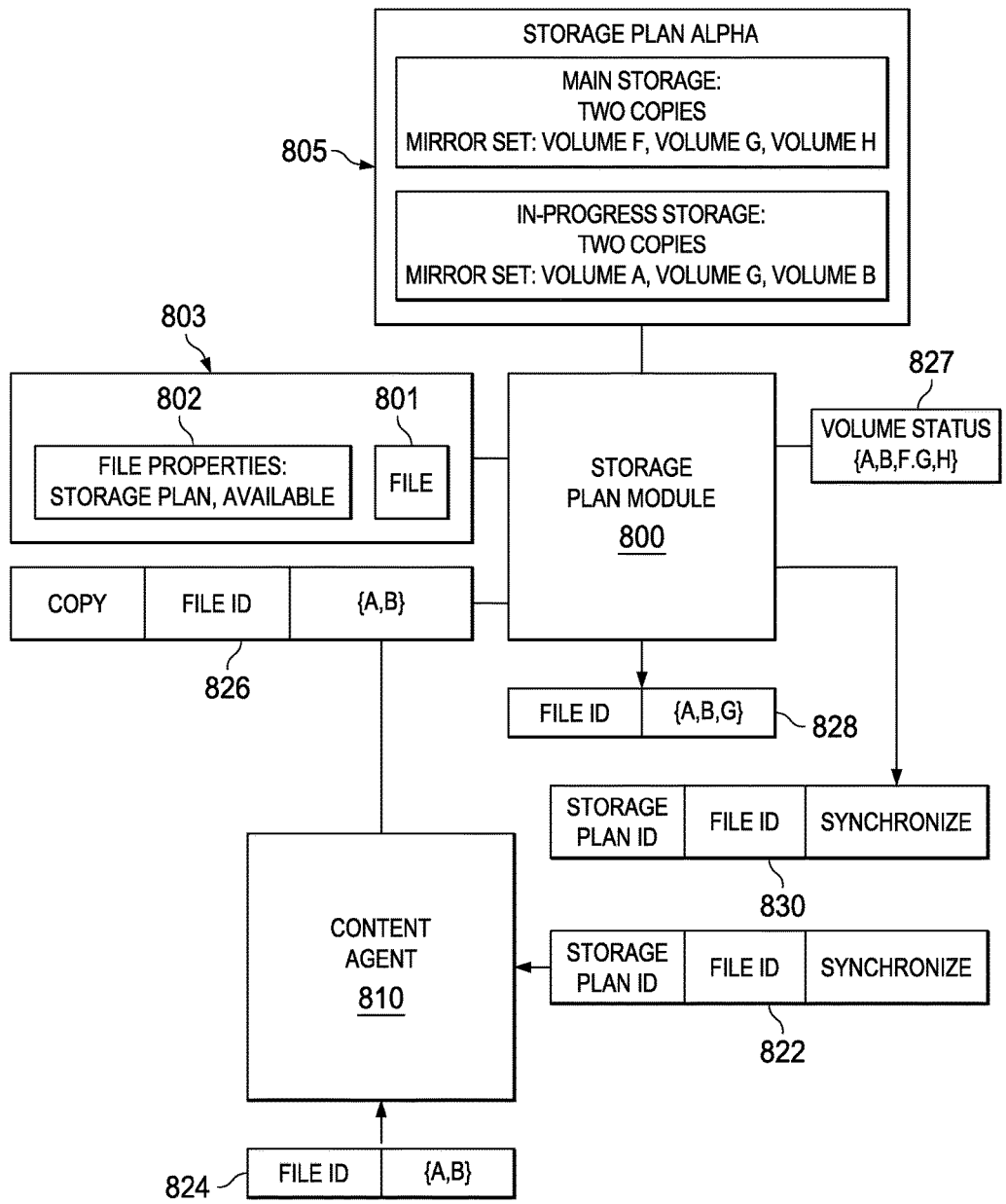

FIG. 8C illustrates that content agent 810 can receive a synchronization request 822 that identifies the file to be synchronized. In this example, the synchronization request may have been generated by another application or module, such as a content management application, when the file changed status from "in-progress" to "available."

Content agent 810 can read a set of file location information 824 and generate a copy request 826 to storage plan module 800 to copy the file from source volumes (e.g., Storage Volume A or Storage Volume B). Storage plan module 800 can access volume status information 827 to determine which of Storage Volume A or Storage Volume B is the least read cost storage volume and which of Storage Volume F, Storage Volume G or Storage Volume H (the mirror storage volumes for the file as specified by the appropriate storage plan 805) is the least write access cost storage volume. Storage plan module 800 can read the file from the least read access cost storage volume, write the file to the least write access cost volume and generate storage ticket 828 to update file storage location information for the file. Additionally, because the file requires additional replication, the storage plan module 800 can issue a synchronize request 830.

Figure 8D:
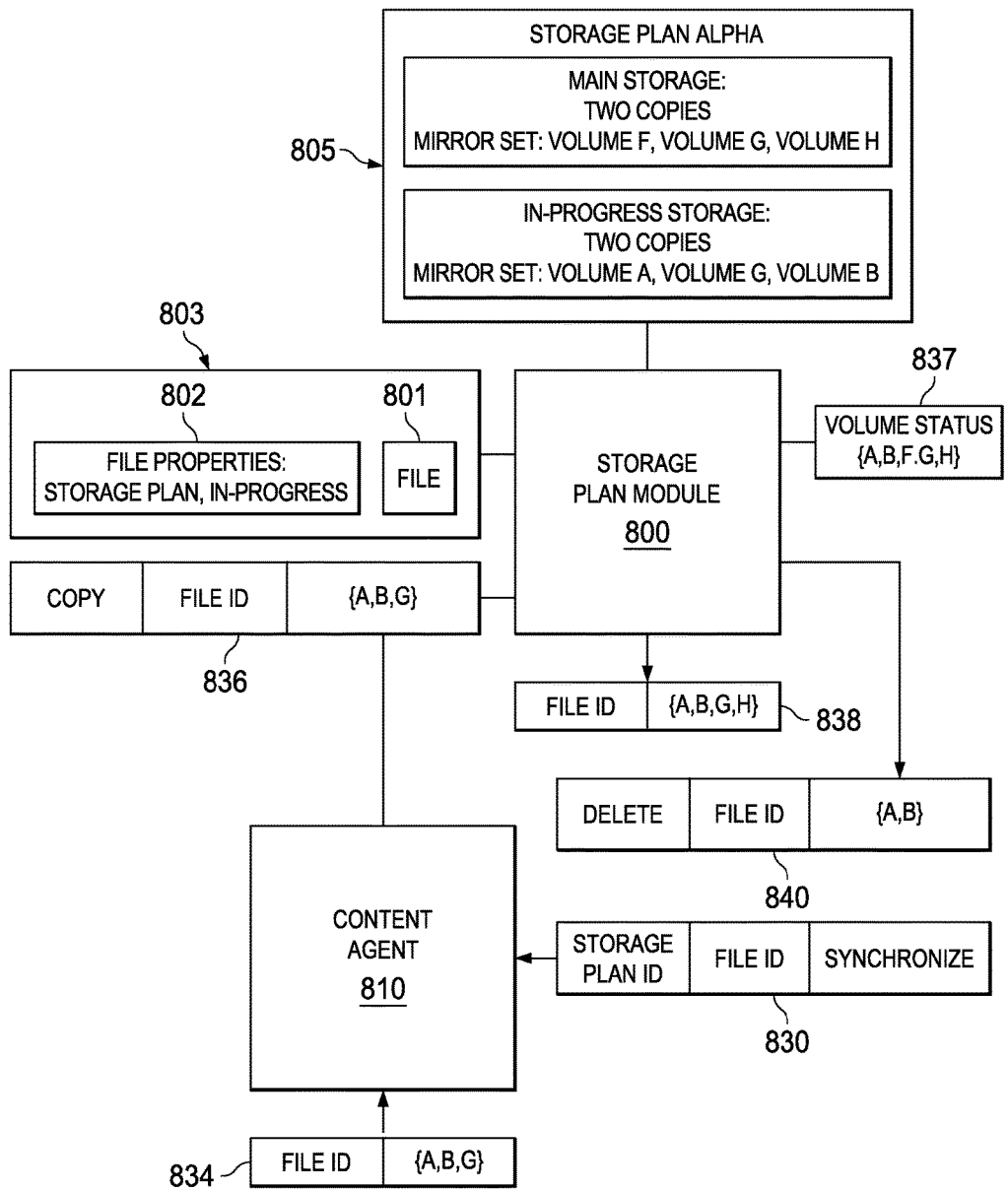

FIG. 8D illustrates that content agent 810 can receive a synchronization request 830 that identifies the file to be synchronized. Content agent 810 can read a set of file location information 834 and generate a copy request 836 to storage plan module 800 to copy the file from source volumes (e.g., Storage Volume A, Storage Volume B or Storage Volume G). Storage plan module 800 can access volume status information 837 to determine which of Storage Volume A, Storage Volume B or Storage Volume G is the least read cost storage volume and which of Storage Volume F or Storage Volume H (the remaining mirror storage volumes for the file as specified by the appropriate storage plan 805) is the least write access cost storage volume. Storage plan module 800 can read the file from the least read access cost storage volume, write the file to the least write access cost volume and generate storage ticket 838 to update file storage location information for the file. Because the file does not require additional replication, the storage plan module 800 can issue delete request 840 to delete the file from Storage Volume A and Storage Volume B (the storage locations corresponding to the file status of "in-progress").

Figure 8E:
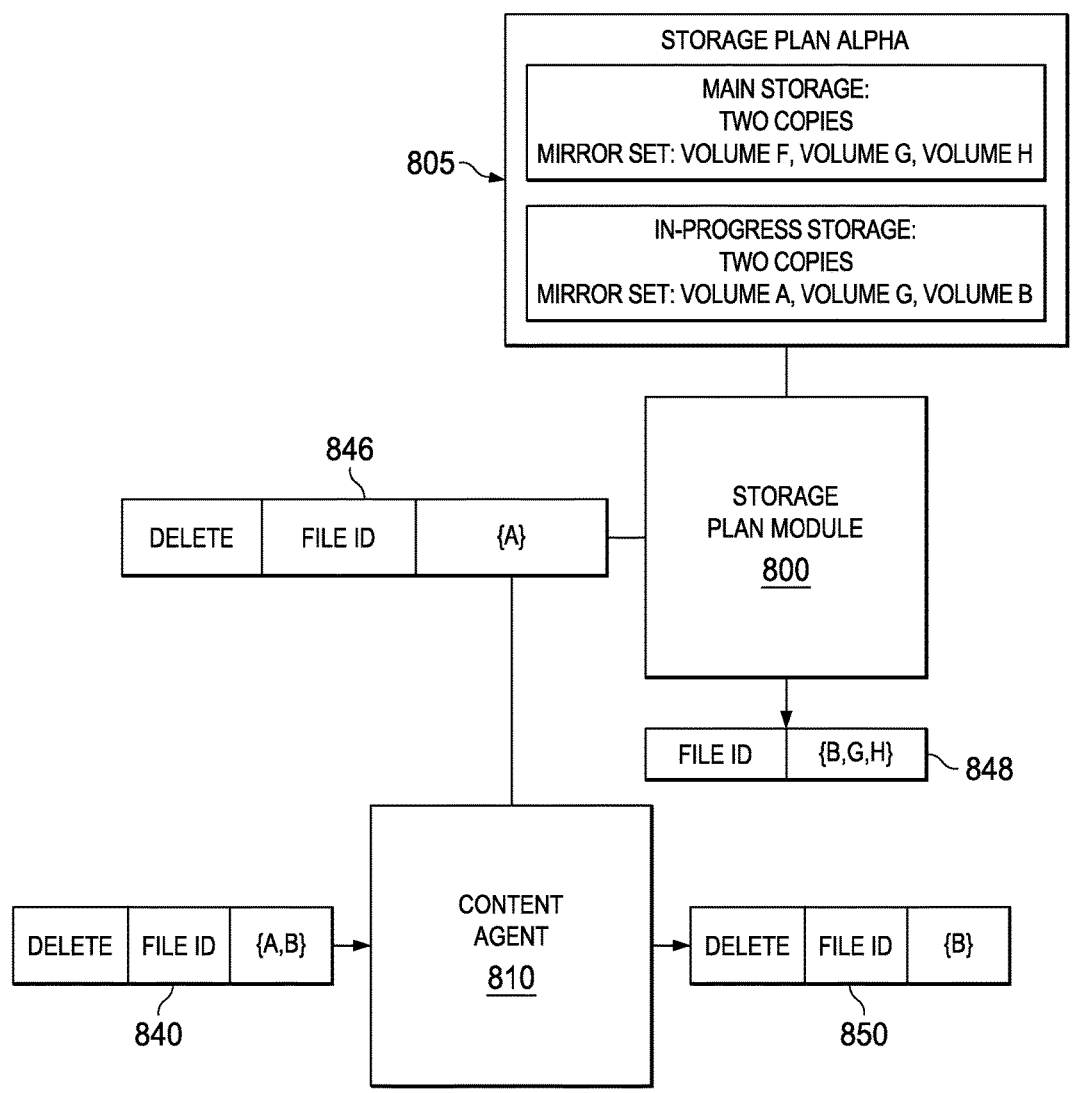

FIG. 8E illustrates that content agent 810 can receive delete request 840 that identifies the file to be deleted. Content agent 810 can select a storage volume from to delete the file and issue a delete request 846 to storage plan module 800. Additionally, if the file is to be deleted from any additional storage volumes, content agent 810 can queue another delete request 850 listing the remaining volumes. Storage plan module 800 can delete the file from the storage volume specified in the delete request 846 and generate a storage ticket 848 to update the file storage location information for the file.

Figure 8F:
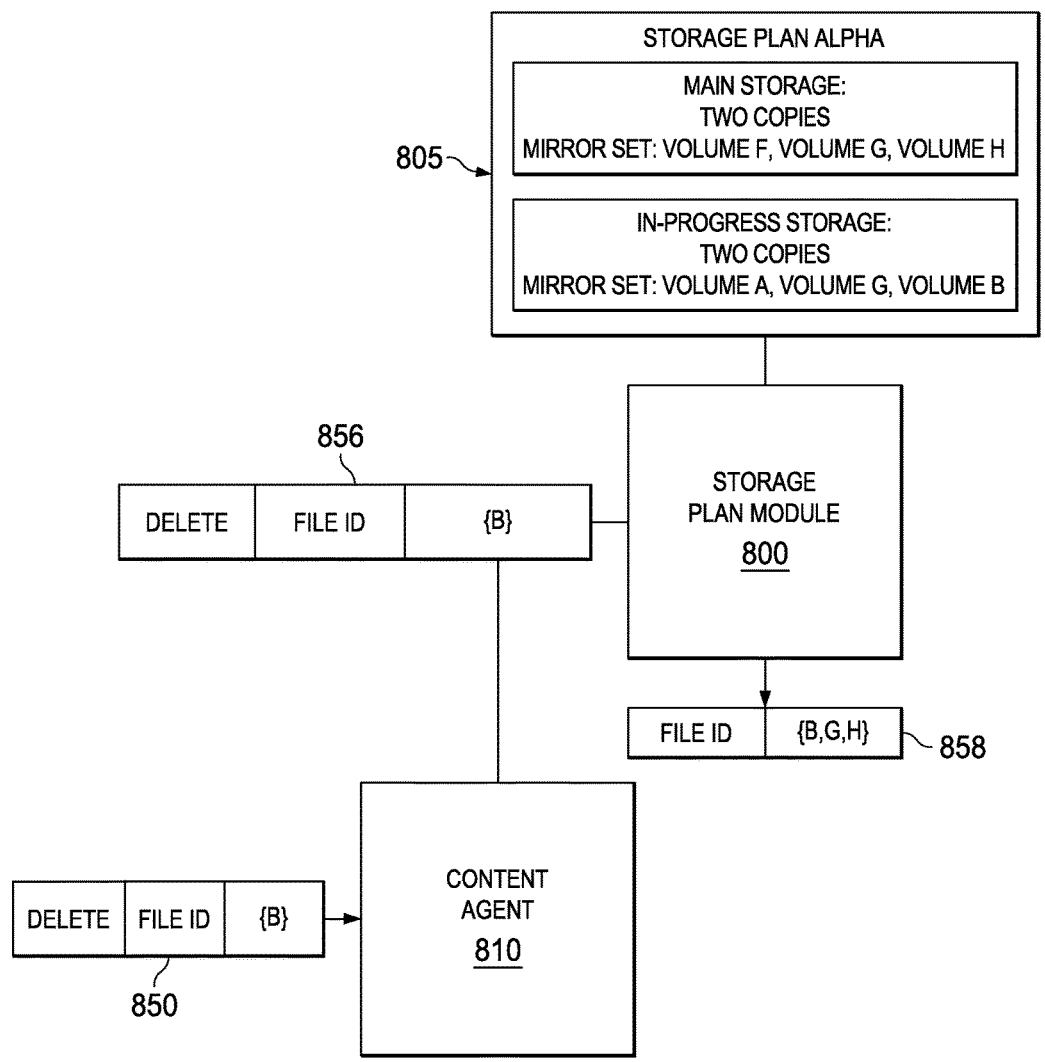

FIG. 8F illustrates that content agent 810 can receive delete request 850 that identifies the file to be deleted. Content agent 810 can select a storage volume from which to delete the file and issue a delete request 856 to storage plan module 800. Storage plan module 800 can delete the file from the storage volume specified in the delete request 856 and generate a storage ticket 858 to update the file storage location information for the file. At this point, replication of the file for an "available" status is complete.

Routines, methods, steps, operations or portions thereof described herein can be implemented through control logic, including computer executable instructions stored on a computer readable medium, hardware, firmware or a combination thereof. The control logic can be adapted to direct an information processing device to perform a set of steps disclosed in the various embodiments. Some embodiments may be implemented by using software programming or code in digital computers, by using application specific integrated circuits, programmable logic devices, field programmable gate arrays, optical, chemical, biological, quantum or nanoengineered systems, components and mechanisms. Based on the disclosure and teachings provided herein, a person of ordinary skill in the art will appreciate other ways and/or methods to implement the invention.

Computer executable instructions or code can be stored in a computer-readable medium and can be operated on by a number of processors to permit a computer to perform functions, steps, operations, methods, routines, operations or portions thereof described herein. Any suitable language can be used including C, C++, Java, JavaScript, assembly language or other programming or scripting code. Different programming techniques can be employed such as procedural or object oriented. In an embodiment, HTML may utilize JavaScript to provide a means of automation and calculation through coding.

A "computer-readable medium" may be any type of data storage medium that can store computer instructions, including, but not limited to read-only memory (ROM), random access memory (RAM), hard disks (HD), data cartridges, data backup magnetic tapes, floppy diskettes, flash memory, optical data storage, CD-ROMs, or the like. The computer readable medium can be, by way of example, only but not by limitation, an electronic, magnetic, optical, electromagnetic, infrared, or semiconductor system, apparatus, system, device, or computer memory. The computer readable medium may include multiple computer readable media storing computer executable instructions, such as in a distributed system or instructions stored across an array.

Any particular step, operation, method, routine, operation or portion thereof can execute on multiple computer processing devices or multiple computer processors. Data may be stored in a single storage medium or distributed through multiple storage mediums, and may reside in a single database or multiple databases (or other data storage). The sequence of operations described herein can be interrupted, suspended, or otherwise controlled by another process, such as an operating system, kernel, etc. The routines can operate in an operating system environment or as stand-alone routines.

A "processor" includes any hardware system, hardware mechanism or hardware component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will be understood for purposes of this disclosure that a service or module is one or more computer devices, configured (e.g., by a computer process or hardware) to perform one or more functions. A service may present one or more interfaces which can be utilized to access these functions. Such interfaces include APIs, interfaces presented for a web services, web pages, remote procedure calls, remote method invocation, etc.

Embodiments can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, memory (e.g., primary or secondary memory such as RAM, ROM, HD or other computer readable medium for the persistent or temporary storage of instructions and data) and one or more input/output ("I/O") device(s). The I/O devices can include a keyboard, monitor, printer, electronic pointing device (for example, mouse, trackball, stylus, etc.), touch screen or the like. In embodiments, the computer has access to at least one database on the same hardware or over the network.

Steps, operations, methods, routines or portions thereof of the present invention may be shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with network and other communications protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. That is, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present).

As used herein, a term preceded by "a" or "an" (and "the" when antecedent basis is "a" or "an") includes both singular and plural of such term unless the context clearly dictates otherwise. Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

In the foregoing specification, the invention has been described with reference to specific embodiments. However, one of ordinary skill in the art appreciates that various modifications and changes can be made without departing from the scope of the invention. Accordingly, the specification, including the Summary and Abstract, and figures are to be regarded in an illustrative rather than a restrictive sense, and all such modifications are intended to be included within the scope of invention.

What is claimed is:

1. A system comprising:
a plurality of storage devices at distributed storage locations of a distributed storage system;
a plurality of servers coupled to the plurality of storage devices, each of the plurality of servers configured to:
access a common plurality of storage volumes on the plurality of storage devices;
track a read access cost and a write access cost for access by that server to each of the plurality of storage volumes, the tracking including updating a moving average of an access cost value over time, at predetermined temporal intervals;
for a request for a requested file, determine a read mirror set of storage volumes on which the requested file is replicated from file location information associated with the requested file, select a least cost member of the read mirror set of storage volumes as a source storage volume, read the requested file from the source storage volume; and
for a request to store a corresponding file, determine a write mirror set of storage volumes for the corresponding file from a storage plan associated with the corresponding file, select a least cost member of the write mirror set as a target storage volume for a first copy of the corresponding file, and store the corresponding file to the target storage volume.

2. The system of claim 1, wherein each of the plurality of servers is configured to access the storage plan from a shared repository.

3. The system of claim 1, wherein each server is configured to update the write access cost for that server for a storage volume of the plurality of storage volumes each time that server writes a file to that storage volume.

4. The system of claim 1, wherein each server is configured to update the read access cost for that server for a storage volume of the plurality of storage volumes each time that server reads a file from that storage volume.

5. The system of claim 1, wherein each server is configured to update a shared database of volume status information with the read access costs and write access costs for that server.

6. The system of claim 1, wherein each server is configured to update the file location information each time that server writes a file to a storage volume of the plurality of storage volumes and store updated file location information to a shared index of replicated files, the shared index of replicated files comprising identifiers of files replicated on the plurality of storage volumes and corresponding storage locations of each of the identified files.

7. The system of claim 1, wherein tracking read access costs and write access costs comprises tracking fixed read access costs, variable read access costs, fixed write access costs and variable write access costs.

8. The system of claim 1, wherein selecting the least cost member of the read mirror set of storage volumes as the source storage volume comprises calculating a predicted read cost according to $aC_{RF}+(F_R/b*C_{RV})$ for each of the read mirror set of storage volumes, where a and b are constants, $C_{RF}$ is a moving average of fixed read costs and $C_{RV}$ is a moving average of variable read costs, $F_R$ is a file size of the requested file, and wherein the least cost member of the read mirror set of storage volumes is the member of the read mirror set of storage volumes with a lowest predicted read cost for that server.

9. The system of claim 1, wherein selecting the least cost member of the write mirror set of storage volumes as the target storage volume comprises calculating a predicted write cost according to $nC_{WF}+(F_W/m*C_{WV})$ for each of the write mirror set of storage volumes, where n and m are constants, $C_{WF}$ is a moving average of fixed write costs and $C_{WV}$ is a moving average of variable write costs, $F_W$ is a file size of the corresponding file to be written, wherein the least cost member of the write mirror set of storage volumes is the member of the write mirror set of storage volumes with a lowest predicted write cost for that server.

10. The system of claim 1, further comprising a replication server that is configured to replicate files stored on the plurality of storage volumes by other servers from the plurality of servers.

11. The system of claim 10, wherein the replication server is out-of-band from the other servers.

12. A server providing efficient mirrored storage access, the server comprising:
a network interface device;
a memory;
a storage controller coupled to the network interface device and the memory, the storage controller configured to:
track a read access cost and write access cost for access by the server to each of a plurality of distributed storage volumes at distributed storage locations accessible by the server over a network, the tracking including updating a moving average of an access cost value over time, at predetermined temporal intervals;
for a requested file, determine from file location information a read mirror set of storage volumes on which the requested file is replicated, select, based on the read access costs, a least cost member of the read mirror set of storage volumes as a source storage volume, and read the file from the source storage volume into the memory; and
for a request to store a corresponding file, determine a write mirror set of storage volumes for the corresponding file from a storage plan, select a least cost member of the write mirror set as a target storage volume for a first copy of the corresponding file, the selection of the least cost member of the write mirror set based on the write access costs, and store the corresponding file to the target storage volume from the memory.

13. The server of claim 12, wherein the storage controller is configured to access the storage plan from a shared repository.

14. The server of claim 12, wherein the server is configured to update the write access cost for the server for a storage volume of the plurality of storage volumes each time the server writes a file to that storage volume.

15. The server of claim 12, wherein the server is configured to update a shared database of volume status information with read access costs and write access costs for the server.

16. The server of claim 12, wherein the server is configured to update the file location information each time the server writes a file to a storage volume of the plurality of storage volumes and store updated file location information to a shared index of replicated files, the shared index of replicated files comprising identifiers of files replicated on the plurality of storage volumes and corresponding storage locations of each of the identified files.

17. The server of claim 12, wherein tracking read access costs and write access costs comprises tracking fixed read access costs, variable read access costs, fixed write access costs and variable write access costs.

18. The server of claim 12, wherein selecting the least cost member of the read mirror set of storage volumes as the source storage volume comprises calculating a predicted read cost according to $aC_{RF}+(F_R/b*C_{RV})$ for each of the read mirror set of storage volumes, where a and b are constants, $C_{RF}$ is a moving average of fixed read costs and $C_{RV}$ is a moving average of variable read costs, $F_R$ is a file size of the requested file, and wherein the least cost member of the read mirror set of storage volumes is the member of the read mirror set of storage volumes with a lowest predicted read cost for the server.

19. The server of claim 12, wherein selecting the least cost member of the write mirror set of storage volumes as the target storage volume comprises calculating a predicted write cost according to $nC_{WF}+(F_W/m*C_{WV})$ for each of the write mirror set of storage volumes, where n and m are constants, $C_{WF}$ is a moving average of fixed write costs and $C_{WV}$ is a moving average of variable write costs, $F_w$ is a file size of the corresponding file to be written, wherein the least cost member of the write mirror set of storage volumes is the member of the write mirror set of storage volumes with a lowest predicted write cost for the server.

20. The server of claim 12, wherein the server is configured to execute a background process to replicate the corresponding file on at least one additional member of the write mirror set of storage volumes.

21. The server of claim 20, wherein the background process is configured to copy the corresponding file from a first member of the write mirror set to a second member of the write mirror set.

22. A system comprising:
a plurality of storage devices;
a plurality of servers coupled to the plurality of storage devices, each of the plurality of servers configured to:
access a plurality of storage volumes on the plurality of storage devices;
track a read access cost and a write access cost for access by one of the servers to each of the plurality of storage volumes;
for a requested file, determine a read mirror set of storage volumes on which the requested file is replicated from file location information associated with the requested file, select a least cost member of the read mirror set of storage volumes as a source storage volume, read the requested file from the source storage volume, wherein selecting the least cost member of the read mirror set of storage volumes as the source storage volume comprises calculating a predicted read cost according to $aC_{RF}+(F_R/b*C_{RV})$ for each of the read mirror set of storage volumes, where a and b are constants, $C_{RF}$ is a moving average of fixed read costs and $C_{RV}$ is a moving average of variable read costs, $F_R$ is a file size of the requested file, and wherein the least cost member of the read mirror set of storage volumes is the member of the read mirror set of storage volumes with a lowest predicted read cost for that server; and
for a request to store a corresponding file, determine a write mirror set of storage volumes for the file from a storage plan associated with the file, select a least cost member of the write mirror set as a target storage volume for a first copy of the corresponding file, and store the corresponding file to the target storage volume.

23. A system comprising:
a plurality of storage devices;
a plurality of servers coupled to the plurality of storage devices, each of the plurality of servers configured to:
access a plurality of storage volumes on the plurality of storage devices;
track a read access cost and a write access cost for access by one of the servers to each of the plurality of storage volumes;
for a requested file, determine a read mirror set of of storage volumes on which the requested file is replicated from file location information associated with the requested file, select a least cost member of the read mirror set of storage volumes as a source storage volume, read the requested file from the source storage volume; and
for a request to store a corresponding file, determine a write mirror set of storage volumes for the file from a storage plan associated with the corresponding file, select a least cost member of the write mirror set as a target storage volume for a first copy of the corresponding file, and store the corresponding file to the target storage volume, wherein selecting the least cost member of the write mirror set of storage volumes as the target storage volume comprises calculating a predicted write cost according to $nC_{WF}+(F_W/m*C_{WV})$ for each of the write mirror set of storage volumes, where n and m are constants, $C_{WF}$ is a moving average of fixed write costs and $C_{WV}$ is a moving average of variable write costs, $F_W$ is a file size of the corresponding file to be written, wherein the least cost member of the write mirror set of storage volumes is the member of the write mirror set of storage volumes with a lowest predicted write cost for that server.

24. A server providing efficient mirrored storage access, the server comprising:
a network interface device;
a memory; and
a storage controller coupled to the network interface device and the memory, the storage controller configured to:
maintain read access costs and write access costs for the server to a plurality of storage volumes;
for a requested file, determine from file location information a read mirror set of storage volumes on which the requested file is replicated, select, based on the read access costs, a least cost member of the read mirror set of storage volumes as a source storage volume, and read the file from the source storage volume into the memory, wherein selecting the least cost member of the read mirror set of storage volumes as the source storage volume comprises calculating a predicted read cost according to $aC_{RF}+(F_R/b*C_{RV})$ for each of the read mirror set of storage volumes, where a and b are constants, $C_{RF}$ is a moving average of fixed read costs and $C_{RV}$ is a moving average of variable read costs, $F_R$ is a file size of the requested file, and wherein the least cost member of the read mirror set of storage volumes is the member of the read mirror set of storage volumes with a lowest predicted read cost for the server; and for a request to store a corresponding file, determine a write mirror set of storage volumes for the corresponding file from a storage plan, select a least cost member of the write mirror set as a target storage volume for a first copy of the corresponding file, the selection of the least cost member of the write mirror set based on the write access costs, and store the corresponding file to the target storage volume from the memory.

25. A server providing efficient mirrored storage access, the server comprising:
a network interface device;
a memory; and
a storage controller coupled to the network interface device and the memory, the storage controller configured to:
maintain read access costs and write access costs for the server to a plurality of storage volumes;
for a requested file, determine from file location information a read mirror set of storage volumes on which the requested file is replicated, select, based on the read access costs, a least cost member of the read mirror set of storage volumes as a source storage volume, and read the file from the source storage volume into the memory; and
for a request to store a corresponding file, determine a write mirror set of storage volumes for the corresponding file from a storage plan, select a least cost member of the write mirror set as a target storage volume for a first copy of the corresponding file, the selection of the least cost member of the write mirror set based on the write access costs, and store the corresponding file to the target storage volume from the memory, wherein selecting the least cost member of the write mirror set of storage volumes as the target storage volume comprises calculating a predicted write cost according to $nC_{WF}+(F_W/m*C_{WV})$ for each of the write mirror set of storage volumes, where n and m are constants, $C_{WF}$ is a moving average of fixed write costs and $C_{WV}$ is a moving average of variable write costs, $F_W$ is a file size of the corresponding file to be written, wherein the least cost member of the write mirror set of storage volumes is the member of the write mirror set of storage volumes with a lowest predicted write cost for the server.

* * * * *